United States Patent
Yamaguchi

(10) Patent No.: US 11,134,163 B2
(45) Date of Patent: Sep. 28, 2021

(54) IMAGE FORMING APPARATUS THAT DISPLACES POSITION OF SHEET ON EXIT TRAY ACCORDING TO WHETHER SHEET MEETS PREDETERMINED CONDITION

(71) Applicant: KYOCERA Document Solutions Inc., Osaka (JP)

(72) Inventor: Kiyotaka Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/926,469

(22) Filed: Jul. 10, 2020

(65) Prior Publication Data

US 2021/0021726 A1    Jan. 21, 2021

(30) Foreign Application Priority Data

Jul. 18, 2019 (JP) .............................. JP2019-132766

(51) Int. Cl.
*H04N 1/21* (2006.01)
*H04N 1/00* (2006.01)

(52) U.S. Cl.
CPC ....... *H04N 1/00631* (2013.01); *H04N 1/0066* (2013.01); *H04N 1/00641* (2013.01); *H04N 1/00663* (2013.01); *H04N 1/00755* (2013.01); *H04N 1/00771* (2013.01)

(58) Field of Classification Search
None
See application file for complete search history.

(56) References Cited

U.S. PATENT DOCUMENTS

| | | | | |
|---|---|---|---|---|
| 7,464,930 B2* | 12/2008 | Masuda | ................ | B65H 31/20 271/224 |
| 10,150,641 B2* | 12/2018 | Noso | ...................... | B65H 31/02 |
| 10,616,424 B2* | 4/2020 | Shirasaki | ............. | H04N 1/0032 |
| 2007/0035080 A1* | 2/2007 | Yamada | .................. | B42C 1/125 270/58.07 |
| 2008/0012209 A1* | 1/2008 | Masuda | ................ | B65H 31/20 271/176 |
| 2012/0282004 A1* | 11/2012 | Furuhashi | .............. | B65H 31/02 399/408 |
| 2014/0346726 A1* | 11/2014 | Matsuo | .................. | B65H 39/00 270/58.09 |
| 2016/0094746 A1* | 3/2016 | Umezawa | .......... | H04N 1/00442 358/1.15 |
| 2016/0347572 A1* | 12/2016 | Noso | ...................... | B65H 37/04 |

FOREIGN PATENT DOCUMENTS

JP    2003-195589 A    7/2003
JP    2012047919 A  *  3/2012

* cited by examiner

*Primary Examiner* — Dung D Tran
(74) *Attorney, Agent, or Firm* — Studebaker & Brackett PC

(57) ABSTRACT

An image forming apparatus includes an exit tray, a displacing mechanism, and a controller. A sheet is ejected on the exit tray. The displacing mechanism displaces a position of the sheet on the exit tray. The controller controls the displacing mechanism. The controller determines whether the sheet is a valid sheet that meets a predetermined condition or an invalid sheet that does not meet the predetermined condition. The controller controls the displacing mechanism so that a position of the valid sheet differs from a position of the invalid sheet on the exit tray.

7 Claims, 13 Drawing Sheets

IMAGE FORMING APPARATUS THAT DISPLACES POSITION OF SHEET ON EXIT TRAY ACCORDING TO WHETHER SHEET MEETS PREDETERMINED CONDITION

INCORPORATION BY REFERENCE

The present application claims priority under 35 U.S.C. § 119 to Japanese Patent Application No. 2019-132766, filed on Jul. 18, 2019. The contents of this application are incorporated herein by reference in their entirety.

BACKGROUND

The present disclosure relates to an image forming apparatus.

There exists an image forming apparatus that sorts paper. Examples of this type of image forming apparatus include an image forming apparatus including a sensor, an exit tray, a reused sheet tray, and a discard tray. The sensor detects a stain on the paper. When a stain is detected on only one side of both sides of a sheet of paper, the image forming apparatus forms an image on the other side where no stain is detected, and then ejects the sheet of paper on the exit tray. When no stain is detected on both the sides of a sheet of paper, the image forming apparatus conveys the sheet of paper to the reused sheet tray without forming any image on each side of the sheet. When a stain is detected on each side of a sheet of paper, the image forming apparatus discards the sheet of paper on the discard tray.

SUMMARY

An image forming apparatus according to an aspect of the present disclosure includes an exit tray, a displacing mechanism, and a controller. The exit tray allows a sheet to be ejected thereon. The displacing mechanism displaces a position of the sheet on the exit tray. The controller controls the displacing mechanism. The controller determines whether the sheet is a valid sheet that meets a predetermined condition or an invalid sheet that does not meet the predetermined condition. The controller controls the displacing mechanism so that a position of the valid sheet differs from a position of the invalid sheet on the exit tray.

DETAILED DESCRIPTION

Figure 1:
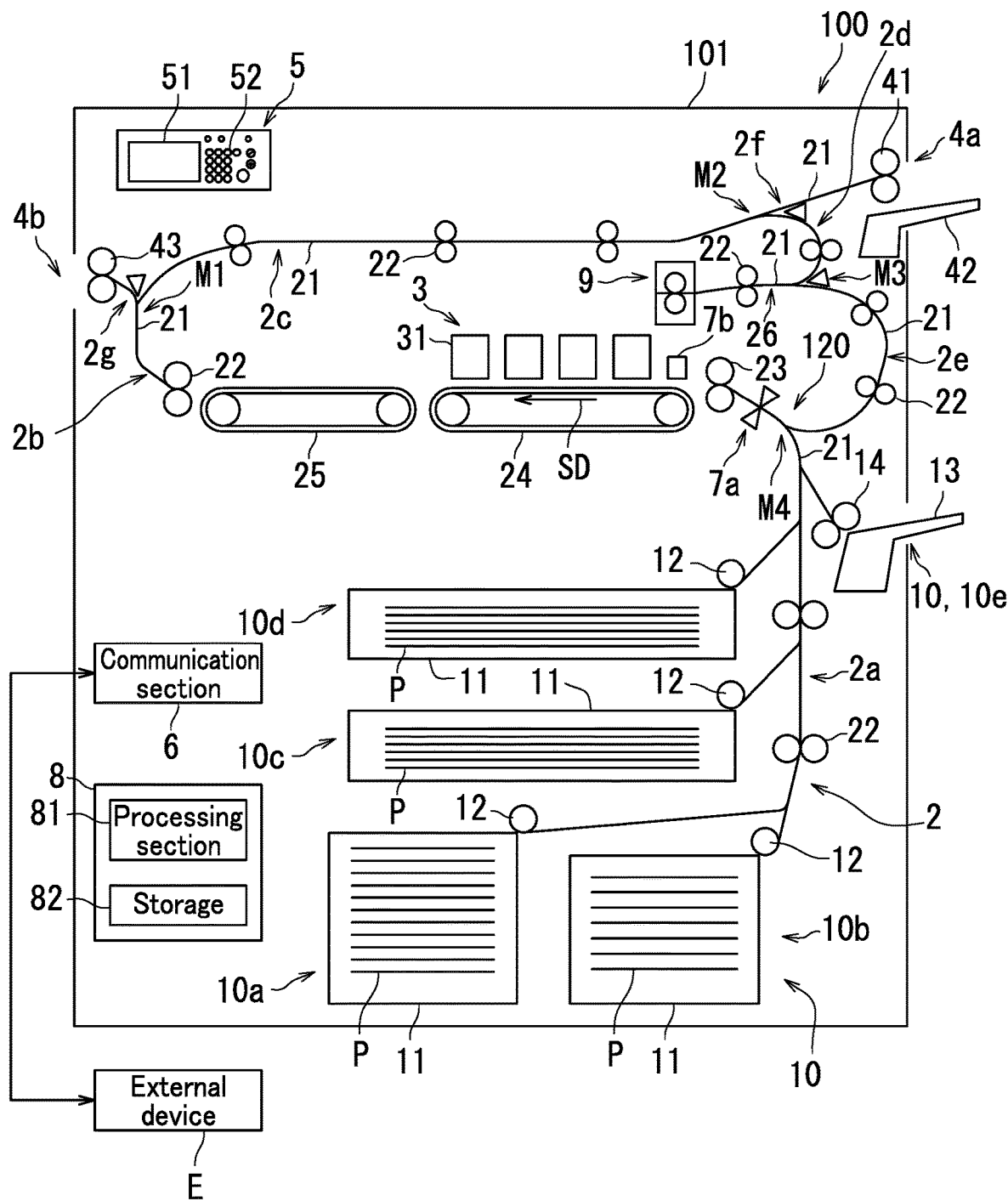
FIG. 1 is a structural diagram of an image forming apparatus according to a first embodiment of the present disclosure.

Embodiments of the present disclosure will hereinafter be described with reference to the accompanying drawings. The present disclosure is however not limited to the embodiments below. Note that overlapping description may be omitted as appropriate. Elements that are the same or equivalent are labelled with the same reference signs in the drawings and description thereof is not repeated.

First Embodiment

An image forming apparatus 100 according to the present embodiment will be described with reference to FIG. 1. FIG. 1 is a structural diagram of the image forming apparatus 100 according to the present embodiment. The image forming apparatus 100 forms an image on a sheet P. Specifically, the image forming apparatus 100 according to the present embodiment is an inkjet printer capable of color printing and monochrome printing.

As illustrated in FIG. 1, the image forming apparatus 100 includes a housing 101, a conveyance section 2, an image forming section 3, a first ejection section 4a, a second ejection section 4b, an operation panel 5, a communication section 6, a dirt sensor 7a, an image sensor 7b, a controller 8, a sheet displacing mechanism 9, a sheet feed section 10, a first conveyance unit 24, and a second conveyance unit 25. The housing 101 accommodates the conveyance section 2, the image forming section 3, the first ejection section 4a, the second ejection section 4b, the communication section 6, the dirt sensor 7a, the image sensor 7b, the controller 8, the sheet displacing mechanism 9, the sheet feed section 10, the first conveyance unit 24, and the second conveyance unit 25.

Hereinafter, the conveyance section 2, the image forming section 3, the sheet displacing mechanism 9, the sheet feed section 10, the first conveyance unit 24, and the second conveyance unit 25 will first be described.

The sheet feed section 10 feeds the sheet P to the conveyance section 2. In the present embodiment, the sheet feed section 10 includes first, second, third and fourth sheet feed sections 10a, 10b, 10c, and 10d, and a manual sheet feed section 10e. Each of the first to fourth sheet feed sections 10a to 10d includes a cassette 11 and a sheet feed roller 12. The cassette 11 contains a sheet P. Specifically, the cassette 11 is allowed to contain sheets P therein. The sheet feed roller 12 picks up a sheet P from the cassette 11 and then feeds the sheet P to the conveyance section 2. Specifically, each of the sheet feed rollers 12 picks up a sheet P at the top when a corresponding cassette 11 contains sheets P.

The manual sheet feed section 10e includes a manual feed tray 13 and a sheet feed roller pair 14. The manual feed tray 13 is located with part thereof protruding outside the housing 101. The manual feed tray 13 allows one or more sheets P to be loaded thereon. Specifically, the manual feed tray 13 allows a user to load sheets P thereon. The sheet feed roller pair 14 picks up a sheet P from the manual feed tray 13 and then feeds the sheet P to the conveyance section 2. Specifically, the sheet feed roller pair 14 picks up a sheet P at the top when sheets P are loaded on the manual feed tray 13.

The conveyance section 2 conveys a sheet P along a conveyance path 21. Specifically, the conveyance section 2 includes conveyance roller pairs 22. The conveyance roller pairs 22 are located along the conveyance path 21. Each of the conveyance roller pairs 22 rotates with the sheet P sandwiched therebetween. As a result, the sheet P is conveyed.

In the present embodiment, the conveyance section 2 includes first, second, third, fourth, fifth, sixth, and seventh conveyance sections 2a, 2b, 2c, 2d, 2e, 2f, and 2g. The conveyance section 2 also includes an inverting section 26.

The sheet P is fed to the first conveyance section 2a from the sheet feed section 10. The first conveyance section 2a conveys the sheet P to the first conveyance unit 24. The first conveyance section 2a includes a registration roller pair 23. The registration roller pair 23 sends the sheet P to the first conveyance unit 24. Specifically, the registration roller pair 23 adjusts timing of sending the sheet P to the first conveyance unit 24. More specifically, the sheet P conveyed to the registration roller pair 23 comes into contact with the registration roller pair 23. The registration roller pair 23 sends the sheet P to the first conveyance unit 24 at timing of image formation by the image forming section 3.

Note that the registration roller pair 23 may correct a posture of the sheet P such that a leading edge of the sheet P is substantially perpendicular to a sub-scanning direction. In other words, the registration roller pair 23 may correct the posture of the sheet P such that the leading edge of the sheet P is substantially perpendicular to a central axis A of an image to be formed on the sheet P. A direction of the leading edge of the sheet P consequently becomes a direction parallel to a main scanning direction. The leading edge of the sheet P comes into contact with the registration roller pair 23 and the sheet P then warps. As a result, the posture of the sheet P is corrected.

The first conveyance unit 24 conveys the sheet P to the second conveyance unit 25. Specifically, the first conveyance unit 24 conveys the sheet P so that the sheet P passes directly below the image forming section 3. The first conveyance unit 24 may include for example an endless belt, a belt drive section, and a negative pressure generating section. The belt is placed directly below the image forming section 3. The negative pressure generating section causes the sheet P to adhere to the belt. The belt drive section rotates the belt. The belt is rotated and thereby the sheet P adhered to the belt passes directly below the image forming section 3.

The image forming section 3 forms an image on the sheet P. Specifically, the image forming section 3 forms the image on the sheet P while the sheet P is being conveyed by the first conveyance unit 24. In duplex printing, the image forming section 3 forms a first image on one side of the sheet P and subsequently forms a second image on a different side of the sheet P.

In the present embodiment, the image forming section 3 includes four recording heads 31. The first conveyance unit 24 conveys the sheet P so that the sheet P passes through an area facing the four recording heads 31. In other words, the sheet S passes through an area directly below the four recording heads 31. Note that in the description below, the one side of the sheet P on which the first image is to be formed may be referred to as a "first side" and the different side of the sheet P on which the second image is to be formed may be referred to as a "second side".

The four recording heads 31 eject respective inks to the sheet P. Specifically, each of the four recording heads 31 has multiple nozzles that are opposite the first conveyance unit 24. Ink is ejected toward the sheet P from each nozzle.

The four recording heads 31 eject their respective color inks toward the sheet P. Here, the color inks are different from one another. More specifically, the four recording heads 31 eject a black ink, a cyan ink, a magenta ink, and a yellow ink.

The second conveyance unit 25 conveys the sheet P to the second conveyance section 2b. The second conveyance unit 25 may include an endless belt, a belt drive section, and a negative pressure generating section like the first conveyance unit 24.

The second conveyance section 2b conveys the sheet P to a first confluence M1 where the third conveyance section 2c and the seventh conveyance section 2g meet. The sheet P reaches the first confluence M1 and is subsequently conveyed to either the third conveyance section 2c or the seventh conveyance section 2g.

The third conveyance section 2c conveys the sheet P to a second confluence M2 where the fourth conveyance section 2d and the sixth conveyance section 2f meet. Specifically, the third conveyance section 2c conveys the sheet S so that the sheet S passes above the image forming section 3. The sheet P reaches the second confluence M2 and is subsequently conveyed to either the fourth conveyance section 2d or the sixth conveyance section 2f.

The fourth conveyance section 2d conveys the sheet P to an inverting section 26 through a third confluence M3 where the inverting section 26 and the fifth conveyance section 2e meet. The inverting section 26 conveys the sheet P in a direction away from the third confluence M3 and subsequently conveys the sheet P toward the third confluence M3. As a result, in duplex printing, the sheet P with an image formed on a side thereof is inverted. The sheet P is conveyed to the fifth conveyance section 2e through the third confluence M3.

In the present embodiment, the sheet displacing mechanism 9 is located at a downstream end of the inverting section 26. In duplex printing, the sheet displacing mechanism 9 displaces a position of the sheet P so that a central axis PA of the sheet P matches a central axis A of the second image. Specifically, the sheet displacing mechanism 9 displaces the position of the sheet P in a direction perpendicular to a conveyance direction SD of the sheet P.

The fifth conveyance section 2e conveys the sheet P to a fourth confluence M4 where the fifth conveyance section 2e and the first conveyance section 2a meet. The sheet P is consequently conveyed to the first conveyance section 2a through the fourth confluence M4. The sheet P is subsequently conveyed again to the registration roller pair 23. The sheet P is then conveyed to the second conveyance section 2b by the first conveyance unit 24 and the second conveyance unit 25. At this moment, the sheet P is conveyed in a state where an opposite side (second side) of the sheet P fed from the sheet feed section 10 faces the image forming section 3. In duplex printing, the second image is consequently formed on the second side of the sheet P.

The sixth conveyance section 2f guides the sheet P to the first ejection section 4a along the conveyance path 21 in the sixth conveyance section 2f. The first ejection section 4a ejects the sheet P outside the housing 101. Specifically, the first ejection section 4a includes a first ejection roller pair 41 and an exit tray 42. The first ejection roller pair 41 rotates with the sheet P sandwiched therebetween, and then ejects the sheet P on the exit tray 42. The exit tray 42 is located with part thereof protruding outside the housing 101.

The seventh conveyance section 2g guides the sheet P to the second ejection section 4b along the conveyance path 21 in the seventh conveyance section 2g. The second ejection section 4b is used in the case where a post-processing device is connected to the image forming apparatus 100. Specifically, the second ejection section 4b ejects the sheet P toward the post-processing device when the post-processing device is connected to the image forming apparatus 100. More specifically, the second ejection section 4b includes a second ejection roller pair 43. The second ejection roller pair 43 rotates with the sheet P sandwiched therebetween, and then ejects the sheet P toward the post-processing device.

In the present embodiment, no post-processing device is connected to the image forming apparatus 100, and therefore the second ejection section 4b is not used. The sheet P having reached the first confluence M1 is therefore conveyed to the third conveyance section 2c. In addition, the ejection destination of the sheet P is restricted to one place—the exit tray 42 in the image forming apparatus 100 according to the present embodiment.

Note that the post-processing device is a device that performs post-processing such as punching and stapling sheets P. The punching includes punching (a) holes in (a) sheets P. The stapling includes fastening sheets P together with (a) staples.

The operation panel 5, the communication section 6, the dirt sensor 7a, the image sensor 7b, and the controller 8 will next be described.

The operation panel 5 is placed on the exterior of the housing 101. The operation panel 5 allows the user to enter various operations. When a user operation is entered, the operation panel 5 transmits a signal indicating the user operation to the controller 8. The controller 8 consequently executes a process corresponding to the user operation.

Specifically, the operation panel 5 includes a touch display 51 and hard keys 52. The touch display 51 displays various screens. The touch display 51 allows the user to enter a gesture operation. Examples of the gesture operation include a tap operation, a swipe operation, and a flick operation. Examples of the hard keys 52 include arrow keys, an enter key, and a numeric keypad. When one or more of the arrow keys are operated, a selection target is changed for example. When the enter key is operated, a selected process is executed for example. When the numeric keypad is operated, information indicating a numeric value is entered into the controller 8.

The communication section 6 is connected to a network such as a local area network (LAN) to communicate with an external device E. The communication section 6 is for example a network interface such as a LAN board. The external device E is for example a personal computer (PC).

The communication section 6 receives job data from the external device E. The job data is transmitted to the controller 8. The job data includes image data, sheet size designation data, sheet feed source designation data, simplex/duplex printing designation data, and monochrome/color printing designation data.

The image data represents an image to be formed on the sheet P. The image data may represent images on pages. A size of the sheet P is designated by the sheet size designation data. A sheet feed source to feed a sheet P is designated by the sheet feed source designation data. A request to select a sheet feed source corresponding to the sheet size designation data may be designated as the sheet feed source by the sheet feed source designation data. In addition, the manual sheet feed section 10e may be designated as the sheet feed source by the sheet feed source designation data. An image being to be formed on either one side (first side) and both sides (first and second sides) of the sheet P is designated by the simplex/duplex printing designation data. Either a monochrome image or a color image being to be formed on the sheet P is designated by the monochrome/color printing designation data.

The dirt sensor 7a detects dirt on the sheet P. Specifically, the dirt sensor 7a generates a dirt detection signal indicating whether or not dirt is present on the sheet P. The dirt detection signal is transmitted to the controller 8. The dirt sensor 7a includes for example a photosensor. Specifically, the photosensor includes a light-emitting element and a light-receiving element. The light-emitting element emits light toward the sheet P. When the light is reflected by the sheet P, the light-receiving element receives the reflected light from the sheet P. The light-receiving element transmits a signal indicating a light quantity of the reflected light as the dirt detection signal to the controller 8.

In the present embodiment, the dirt sensor 7a detects dirt from each side of the sheet P. The first conveyance section 2a is provided with the dirt sensor 7a. Specifically, the dirt sensor 7a is located downstream of the fourth confluence M4 in the conveyance direction SD of the sheet P.

The image sensor 7b scans the sheet P to generate a sheet image signal representing an image of the sheet P. The sheet image signal is transmitted to the controller 8. The image sensor 7b includes for example a contact image sensor. In the present embodiment, the image sensor 7b is placed between the registration roller pair 23 and the image forming section 3.

The controller 8 controls an operation of each constituent element of the image forming apparatus 100. Specifically, the controller 8 includes a processing section 81 and storage 82. The processing section 81 executes a control program stored in the storage 82, thereby controlling the operation of each constituent element of the image forming apparatus 100. The processing section 81 includes a processor or an arithmetic circuit such as a central processing unit (CPU) or a micro processing unit (MPU).

The storage 82 stores therein the control program. The storage 82 also stores therein various data and information. For example, the storage 82 stores therein the job data received by the communication section 6. In addition, the storage 82 stores therein size data that is set for each of the first to fourth sheet feed sections 10a to 10d. Each piece of size data indicates a size of corresponding sheets P. The storage 82 includes for example a hard disk drive (HDD), random-access memory (RAM), and read-only memory (ROM).

The controller 8 may include an integrated circuit for image processing. The integrated circuit for image processing typically includes an application specific integrated circuit (ASIC). The integrated circuit for image processing performs image processing on the image data stored in the storage 82 to convert the image data into image data for image formation (printing).

In the present embodiment, the processing section 81 determines whether the sheet P is a valid sheet P1 that meets a predetermined condition or an invalid sheet P2 that does not meet the predetermined condition. Specifically, the processing section 81 determines whether the sheet P fed from the sheet feed section 10 to the first conveyance section 2a is either the valid sheet P1 or the invalid sheet P2. If determining that the sheet P is the invalid sheet P2, the processing section 81 controls the sheet displacing mechanism 9 so that a position of the valid sheet P1 differs from a position of the invalid sheet P2 on the exit tray 42.

In the present embodiment, the predetermined condition includes a first condition, a second condition, a third condition, and a fourth condition. If the sheet P meets all the first to fourth conditions, the processing section 81 determines that the sheet P is the valid sheet P1. In contrast, if the sheet P does not meet any of the first to fourth conditions, the processing section 81 determines that the sheet P is the invalid sheet P2.

The first condition is a condition that no dirt be present on the sheet P. The processing section 81 determines whether or not dirt is present on the sheet P based on the dirt detection signal output from the dirt sensor 7a. Here, if dirt is present on a side of the sheet P on which an image is to be formed, the sheet P is an error sheet that is inappropriate as a target on which the image is to be formed—an image formation target.

Specifically, in simplex printing, the processing section 81 determines whether or not dirt is present on the first side of the sheet P. If determining that dirt is present on the first side of the sheet P, the processing section 81 determines that the sheet P is the invalid sheet P2. In duplex printing, the processing section 81 determines whether or not dirt is present on both sides (first and second sides) of the sheet P. If determining that dirt is present on any of the first and second sides of the sheet P, the processing section 81 determines that the sheet P is the invalid sheet P2. The invalid sheet P2 that does not meet the first condition may hereinafter be referred to as a "dirt-detected sheet P2".

The second condition is a condition that the central axis PA of the sheet P approximately match the central axis A of the image to be formed on the sheet P. When an image is formed on the sheet P in a state where the central axis PA of the sheet P does not match the central axis A of the image, the image has a distorted posture relative to the sheet P. The sheet P in a state where the central axis PA of the sheet P does not match the central axis A of the image is an error sheet inappropriate as the image formation target.

Specifically, the processing section 81 acquires the central axis PA of the sheet P based on the sheet image signal output from the image sensor 7b. In addition, the processing section 81 acquires the central axis A of the image from the job data (image data). The processing section 81 then determines whether or not the central axis PA of the sheet P matches the central axis A of the image. If determining that the central axis PA of the sheet P does not match the central axis A of the image, the processing section 81 determines that the sheet P is the invalid sheet P2. The invalid sheet P2 that does not meet the second condition may hereinafter be referred to as a "center position error sheet P2".

The third condition is a condition that no hole be formed in the sheet P. Here, if one or more holes are formed in a sheet P with a side on which an image is to be formed, the sheet P is an error sheet inappropriate as the image formation target.

The processing section 81 determines whether or not the sheet P meets the third condition based on whether or not execution of a mask process has been detected. Specifically, the processing section 81 determines whether or not one or more punch holes are formed in the sheet P based on the sheet image signal output from the image sensor 7b. If determining that one or more punch holes are formed in the sheet P, the processing section 81 executes the mask process. When detecting the execution of the mask process, the processing section 81 determines that the sheet P is the invalid sheet P2. The mask process is a process of forbidding nozzles corresponding to the one or more punch holes to eject ink. For example, the mask process is a process of changing each of one or more parts of an image represented by the image data to a blank. Here, the one or more parts correspond to the one or more punch holes, respectively. Note that in the description below, the invalid sheet P2 that does not meet the third condition may be referred to as a "mask process detection sheet P2".

The fourth condition is a condition that an actual size match a size indicated by the size data. Here, the actual size is a size of the sheet P being conveyed by the conveyance section 2. In other words, the fourth condition is a condition that a size of the sheet P contained in the sheet feed section 10 match the size indicated by the size data.

The processing section 81 acquires the actual size based on the sheet image signal output from the image sensor 7b. The processing section 81 also acquires the size data based on the job data. For example, the processing section 81 acquires the size data from the job data (size designation data). Alternatively, the processing section 81 determines a sheet feed source of the sheet P from the job data, and acquires size data corresponding to the determined sheet feed source from respective size data predetermined with respect to the first to fourth sheet feed sections 10a to 10d.

The processing section 81 determines whether or not the actual size matches the size indicated by the size data. When determining that the actual size does not match the size indicated by the size data, the processing section 81 determines that the sheet P is the invalid sheet P2. When the actual size does not match the size indicated by the size data, it is impossible to appropriately form an image on the sheet P. The sheet P whose actual size is different from the size indicated by the size data is therefore an error sheet inappropriate as the image formation target. Note that in the description below, the invalid sheet P2 that does not meet the fourth condition may be referred to as a "size error sheet P2".

In simplex printing, when determining that the sheet P is the valid sheet P1, the processing section 81 controls the conveyance section 2, the first conveyance unit 24, and the second conveyance unit 25 so that the valid sheet P1 is ejected on the exit tray 42.

In simplex printing, when determining that the sheet P is the invalid sheet P2, the processing section 81 controls the conveyance section 2, the first conveyance unit 24, and the second conveyance unit 25 so that the invalid sheet P2 is conveyed to the inverting section 26. The processing section 81 then controls the sheet displacing mechanism 9 so that a position of the valid sheet P1 differs from a position of the invalid sheet P2 on the exit tray 42. Specifically, the sheet displacing mechanism 9 displaces the position of the invalid sheet P2 in the direction perpendicular to the conveyance direction SD so that a central axis PA2 of the invalid sheet P2 is shifted from a central axis PA1 of the valid sheet P1 on the exit tray 42.

The processing section 81 controls the conveyance section 2, the first conveyance unit 24, and the second conveyance unit 25 so that the invalid sheet P2 is ejected on the exit tray 42. Specifically, the invalid sheet P2 is conveyed to the first conveyance section 2a via the fifth conveyance section 2e from the inverting section 26. The invalid sheet P2 is then conveyed from the first conveyance section 2a to the first conveyance unit 24, and subsequently conveyed to the first ejection section 4a via the second conveyance unit 25, the second conveyance section 2b, the third conveyance section 2c, and the sixth conveyance section 2f.

In duplex printing, when determining that the sheet P is the invalid sheet P2, the processing section 81 controls the conveyance section 2, the first conveyance unit 24, and the second conveyance unit 25 so that the invalid sheet P2 is conveyed to the inverting section 26. The processing section 81 then controls the sheet displacing mechanism 9 so that the position of the valid sheet P1 differs from the position of the invalid sheet P2 on the exit tray 42.

The processing section 81 subsequently controls the conveyance section 2, the first conveyance unit 24, and the second conveyance unit 25 so that the invalid sheet P2 is ejected on the exit tray 42. At this moment, the processing section 81 forbids the image forming section 3 to form the second image. The second image is therefore not formed on the second side of the invalid sheet P2 in duplex printing. It is consequently possible to prevent unnecessary printing on the invalid sheet P2. In addition, ink consumption can be reduced.

In the present embodiment described above with reference to FIG. 1, the invalid sheet P2 can be ejected on the exit tray 42 so that the position of the invalid sheet P2 differs from the position of the valid sheet P1. Specifically, the valid sheet P1 and the invalid sheet P2 are placed on the exit tray 42 in a state where the valid sheet P1 and the invalid sheet P2 are shifted relative to each other in the direction perpendicular to the conveyance direction SD. It is consequently possible for a worker to easily distinguish the valid sheet P1 and the invalid sheet P2 on the exit tray. In the image forming apparatus 100 according to the present embodiment, it is possible to assist the worker in work for sorting sheets P into valid sheets P1 (normal sheets) and invalid sheets P2 (error sheets) even if the ejection destination of the sheets P is restricted to one place.

Figure 2A:
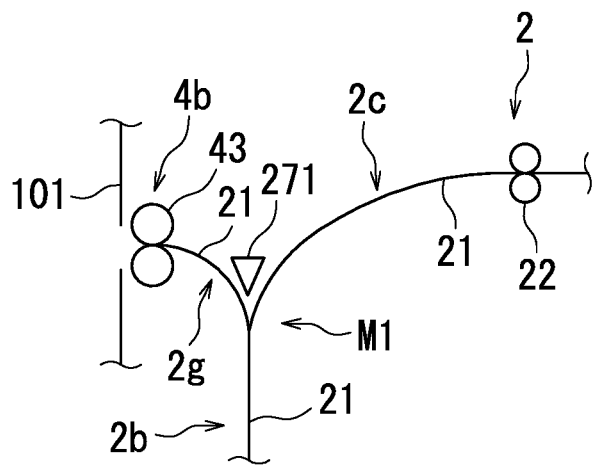
FIG. 2A illustrates the vicinity of a first confluence in a conveyance section of the image forming apparatus.

The conveyance section 2 will next be described with further reference to FIGS. 2A and 2B. FIG. 2A illustrates the vicinity of the first confluence M1 in the conveyance section 2. As illustrated in FIG. 2A, the conveyance section 2 includes a first diverging member 271 located at the first confluence M1. The first diverging member 271 is free to swing. A conveyance destination of the sheet P is determined to be one of the third conveyance section 2c and the seventh conveyance section 2g according to a posture of the first diverging member 271. Note that in the present embodiment the posture of the first diverging member 271 is controlled so that the sheet P is conveyed to the third conveyance section 2c.

Figure 2B:
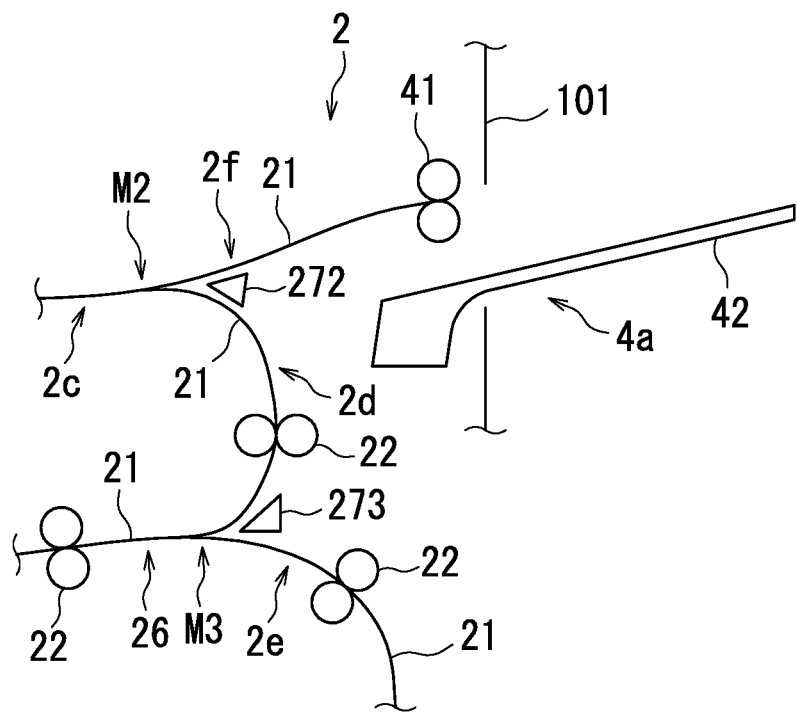
FIG. 2B illustrates the vicinity of a second confluence and a third confluence in the conveyance section.

FIG. 2B illustrates the vicinity of the second and third confluences M2 and M3 in the conveyance section 2. As illustrated in FIG. 2B, the conveyance section 2 further includes a second diverging member 272 and a third diverging member 273.

The second diverging member 272 is located at the second confluence M2. The second diverging member 272 is free to swing. The conveyance destination of the sheet P is determined to be one of the fourth conveyance section 2d and the sixth conveyance section 2f according to a posture of the second diverging member 272.

The third diverging member 273 is located at the third confluence M3. The third diverging member 273 is free to swing. The conveyance destination of the sheet P is determined to be one of the inverting section 26 and the fifth conveyance section 2e according to a posture of the third diverging member 273.

Figure 3A:
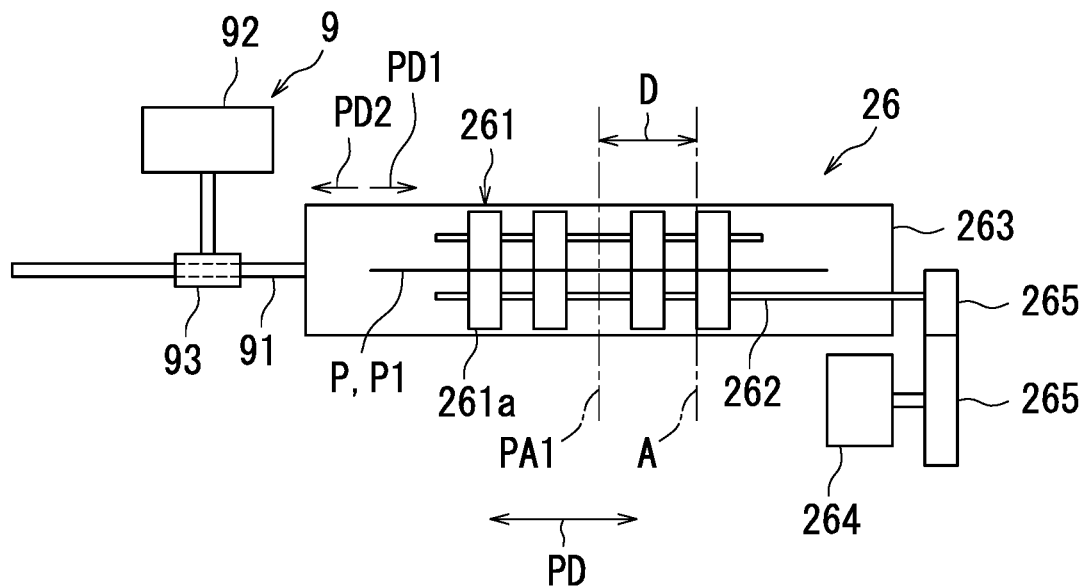
FIG. 3A is a front view of an inverting section and a sheet displacing mechanism in the image forming apparatus.

The inverting section 26 and the sheet displacing mechanism 9 will next be described with reference to FIGS. 1 and 3A to 6. FIG. 3A is a front view of the inverting section 26 and the sheet displacing mechanism 9. Specifically, FIG. 3A illustrates the inverting section 26 and the sheet displacing mechanism 9 in a state where the valid sheet P1 has reached a downstream end of the inverting section 26 in duplex printing.

A structure of the inverting section 26 will first be described with reference to FIGS. 1 and 3A. As illustrated in FIG. 3A, the inverting section 26 includes inverting roller pairs 261, a drive shaft 262, a case member 263, an inverting motor 264, and gears 265.

The inverting roller pairs 261 are contained in the case member 263. The inverting roller pairs 261 are supported by the case member 263 in a rotatable manner. The inverting roller pairs 261 are located in a sheet width direction PD. Here, the sheet width direction PD is the direction perpendicular to the conveyance direction SD of the sheet P. When the sheet P is conveyed from the fourth conveyance section 2d (FIG. 1) to the inverting section 26, the sheet P is sandwiched between each of the inverting roller pairs 261.

Each of the inverting roller pairs 261 include a driven roller 261a. The driven rollers 261a are fixed to the drive shaft 262. The drive shaft 262 is rotated, thereby rotating the driven rollers 261a. Each of the inverting roller pairs 261 consequently rotate.

The inverting motor 264 generates a driving force for rotating the inverting roller pairs 261. The gears 265 transmit the driving force generated by the inverting motor 264 to the drive shaft 262. Each of the inverting roller pairs 261 consequently rotate.

Specifically, the inverting motor 264 is a forward/reverse rotation motor. The inverting motor 264 rotates forward when the sheet P is conveyed from the fourth conveyance section 2d (FIG. 1) to the inverting section 26. The sheet P is consequently conveyed in a direction away from the third confluence M3 (FIG. 1). The inverting motor 264 subsequently rotates reverse. The sheet P is consequently conveyed in a direction toward the third confluence M3 (FIG. 1).

A structure of the sheet displacing mechanism 9 will next be described with reference to FIG. 3A. As illustrated in FIG. 3A, the sheet displacing mechanism 9 includes a coupling member 91, a drive source 92, and a driving force transmission section 93.

The coupling member 91 is coupled to the case member 263 of the inverting section 26. The coupling member 91 extends in the sheet width direction PD. The coupling member 91 is for example a rod-shaped member. The drive source 92 generates a driving force for moving the coupling member 91 in the sheet width direction PD. The driving force transmission section 93 transmits the driving force generated by the drive source 92 to the coupling member 91. The coupling member 91 consequently moves in the sheet width direction PD. When the coupling member 91 moves in the sheet width direction PD, the case member 263 of the inverting section 26 moves in the sheet width direction PD and the inverting roller pairs 261 move in the sheet width direction PD. The position of the sheet P sandwiched between each of the inverting roller pairs 261 is therefore displaced in the sheet width direction PD.

Specifically, the drive source 92 includes a forward/reverse rotation motor. The sheet width direction PD includes a first direction PD1 and a second direction PD2. Here, the second direction PD2 is an opposite direction of the first direction PD1. The first direction PD1 is a direction in which the case member 263 leaves the driving force transmission section 93. The second direction PD2 is a direction in which the case member 263 approaches the driving force transmission section 93. When the forward/reverse rotation motor of the drive source 92 rotates forward, the coupling member 91 moves in the first direction PD1. When the forward/reverse rotation motor of the drive source 92 rotates reverse, the coupling member 91 moves in the second direction PD2.

Figure 4A:
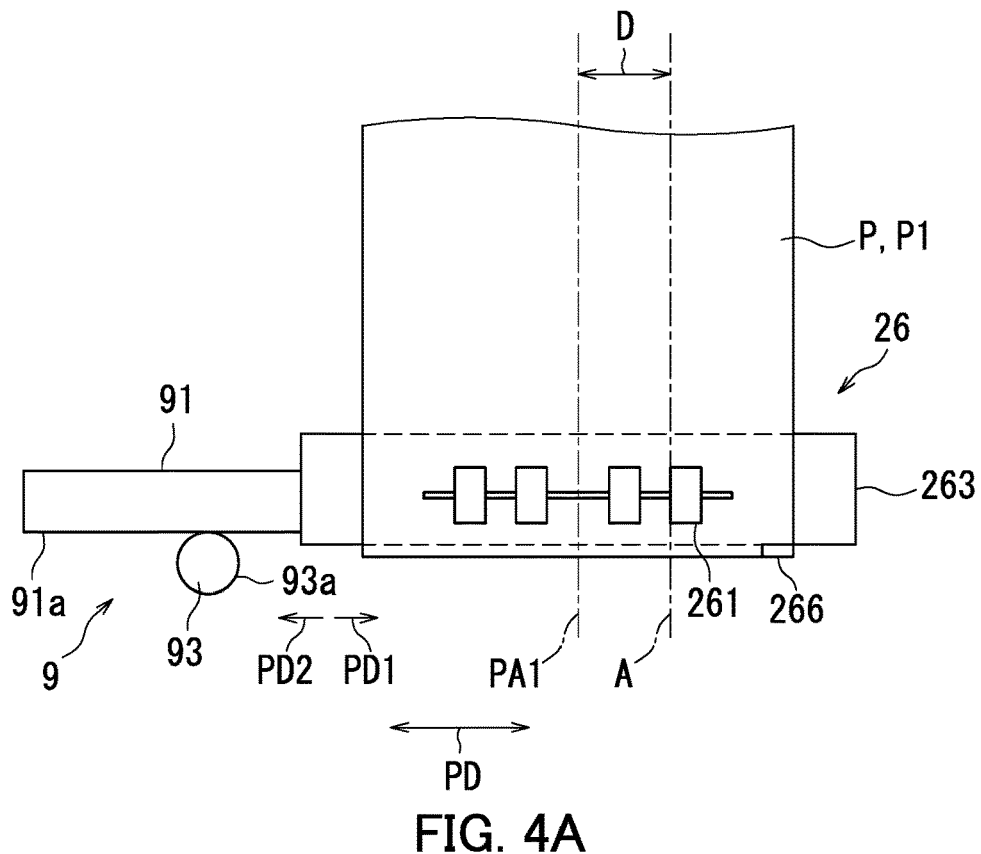
FIG. 4A is a plan view of the inverting section and the sheet displacing mechanism.

A structure of the inverting section 26 will next further be described with reference to FIGS. 1 and 4A. FIG. 4A is a front view of the inverting section 26 and the sheet displacing mechanism 9. Note that in FIG. 4A the drive shaft 262, the inverting motor 264, the gears 265, and the drive source 92 are omitted for easy understanding.

As illustrated in FIG. 4A, the inverting section 26 further includes a sheet-leading-edge sensor 266. The sheet-leading-edge sensor 266 is placed on the exterior of the case member 263. Specifically, the sheet-leading-edge sensor 266 is located downstream of the case member 263 in the conveyance direction SD of the sheet P.

The sheet-leading-edge sensor 266 detects the leading edge of the sheet P. When detecting the leading edge of the sheet P, the sheet-leading-edge sensor 266 outputs a sheet-leading-edge detection signal to the controller 8 (FIG. 1). Here, the sheet-leading-edge detection signal indicates that the leading edge of the sheet P has been detected. When receiving the sheet-leading-edge detection signal, the controller 8 (FIG. 1) causes the conveyance section 2 to stop conveying the sheet P.

The sheet-leading-edge sensor 266 includes for example a photosensor. Specifically, the photosensor includes a light-emitting element and a light-receiving element. Here, the light-receiving element receives light emitted from the light-emitting element. The light-receiving element outputs to the controller 8 (FIG. 1) a signal indicating light quantity of the received light as the sheet-leading-edge detection signal. Specifically, when the leading edge of the sheet P reaches a position between the light-emitting element and the light-receiving element, the sheet P blocks the light emitted from the light-emitting element. As a result, the light-receiving element becomes unable to receive the light emitted from the light-emitting element, which causes the signal output from the light-receiving element to the controller 8 (FIG. 1) to change. When the signal output from the photosensor changes, the processing section 81 (FIG. 1) determines that the photosensor detects the leading edge of the sheet P. In other words, the processing section 81 (FIG. 1) determines that the sheet P is sandwiched between the inverting roller pairs 261.

The structure of the sheet displacing mechanism 9 will next be described with further reference to FIGS. 3A and 4A. As illustrated in FIG. 4A, the driving force transmission section 93 is a gear member and has a tooth section 93a. The tooth section 93a is formed around an outer circumferential surface of the driving force transmission section 93 (gear member). Specifically, the tooth section 93a of the driving force transmission section 93 (gear member) has teeth arranged in a circumferential direction of the driving force transmission section 93 (gear member). The driving force transmission section 93 rotates by the driving force generated by the drive source 92 (FIG. 3A).

The coupling member 91 includes a tooth section 91a. The tooth section 91a is formed in a facing side of sides of the coupling member 91. Here, the facing side faces the driving force transmission section 93 (gear member). Specifically, the tooth section 91a of the coupling member 91 has teeth arranged in the sheet width direction PD. The driving force transmission section 93 is located in a position where the tooth section 93a of the driving force transmission section 93 meshes with the tooth section 91a of the coupling member 91. The driving force generated by the drive source 92 (FIG. 3A) is consequently transmitted to the coupling member 91.

Figure 3B:
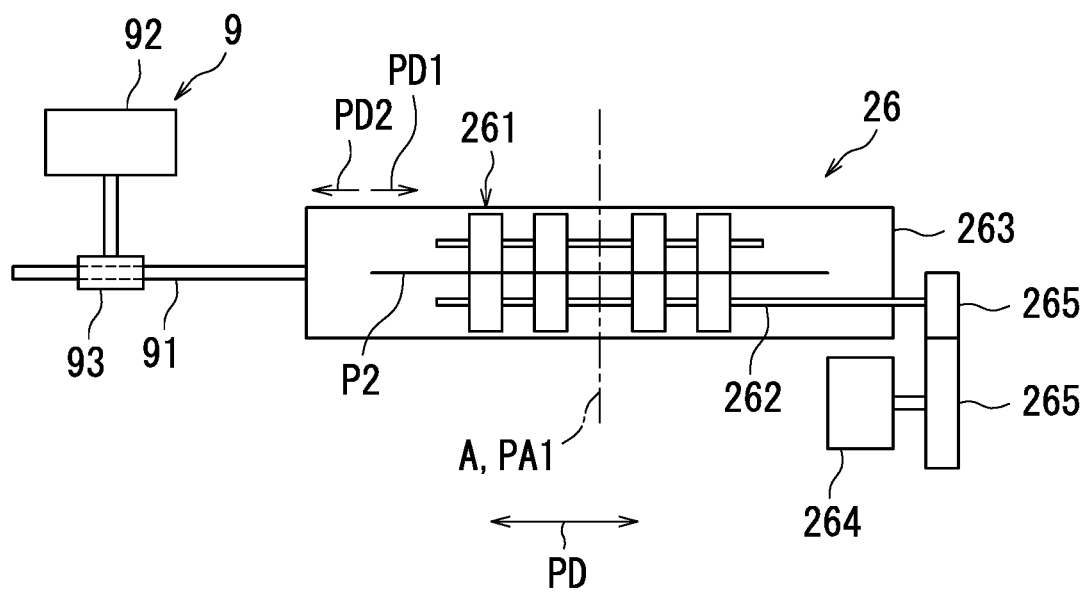
FIG. 3B is a front view of the inverting section and the sheet displacing mechanism after the sheet displacing mechanism displaces a position of a valid sheet.
Figure 4B:
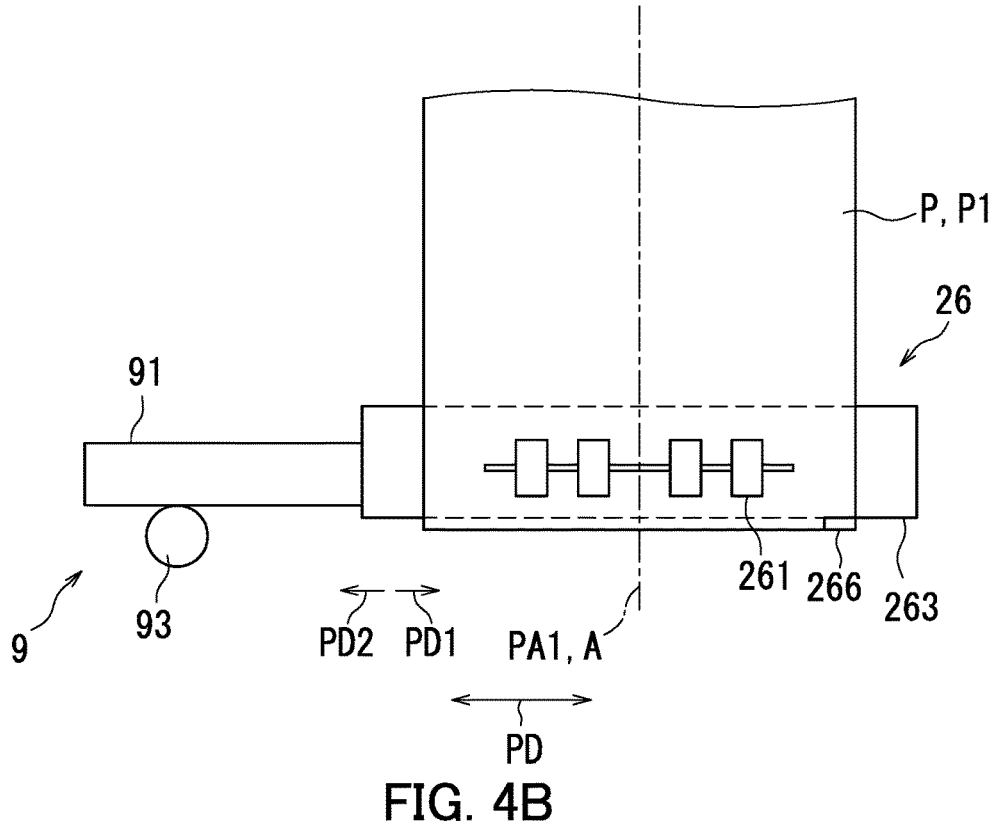
FIG. 4B is a plan view of the inverting section and the sheet displacing mechanism after the sheet displacing mechanism displaces the position of the valid sheet.

Operation of the sheet displacing mechanism 9 will next be described with reference to FIGS. 1 and 3A to 4B. FIG. 3B is a front view of the inverting section 26 and the sheet displacing mechanism 9 after the sheet displacing mechanism 9 displaces the position of the valid sheet 9. FIG. 4B is a plan view of the inverting section 26 and the sheet displacing mechanism 9 after the sheet displacing mechanism 9 displaces the position of the valid sheet P1. Specifically, FIGS. 3B and 4B illustrate a state after the sheet displacing mechanism 9 displaces the position of the valid sheet P1 so that the central axis PA1 of the valid sheet P1 matches the central axis A of the second image in duplex printing. Note that in FIG. 4B the drive shaft 262, the inverting motor 264, the gears 265, and the drive source 92 are omitted for easy understanding.

FIGS. 3A and 4A illustrate a state where the inverting roller pairs 261 are in an initial position. In duplex printing, when the valid sheet P1 is conveyed to the inverting section 26, the valid sheet P1 is sandwiched between each of the inverting roller pairs 261 in the initial position. FIGS. 3A and 4A illustrate a state where the central axis PA1 of the valid sheet P1 does not match the central axis A of the second image when the valid sheet P1 is conveyed from the fourth conveyance section 2d (FIG. 1) to the inverting section 26. Specifically, the central axis PA1 of the valid sheet P1 is separated by a distance D from the central axis A of the second image in the second direction PD2.

As illustrated in FIGS. 3A to 4B, when the valid sheet P1 is conveyed from the fourth conveyance section 2d (FIG. 1) to the inverting section 26, the sheet displacing mechanism 9 moves the inverting roller pairs 261 by the distance D in the first direction PD1 from the initial position. In duplex printing, the valid sheet P1 consequently takes a posture such that the central axis PA1 of the valid sheet P1 matches the central axis A of the second image in the inverting section 26 (FIGS. 3B and 4B).

Figure 5A:
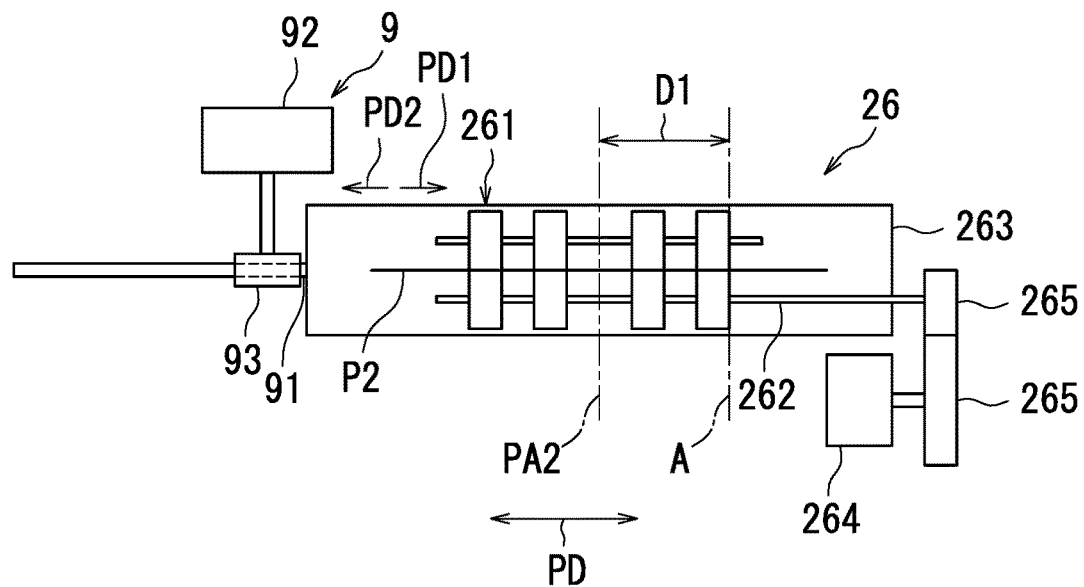
FIG. 5A is a front view of the inverting section and the sheet displacing mechanism after the sheet displacing mechanism displaces a position of an invalid sheet.
Figure 5B:
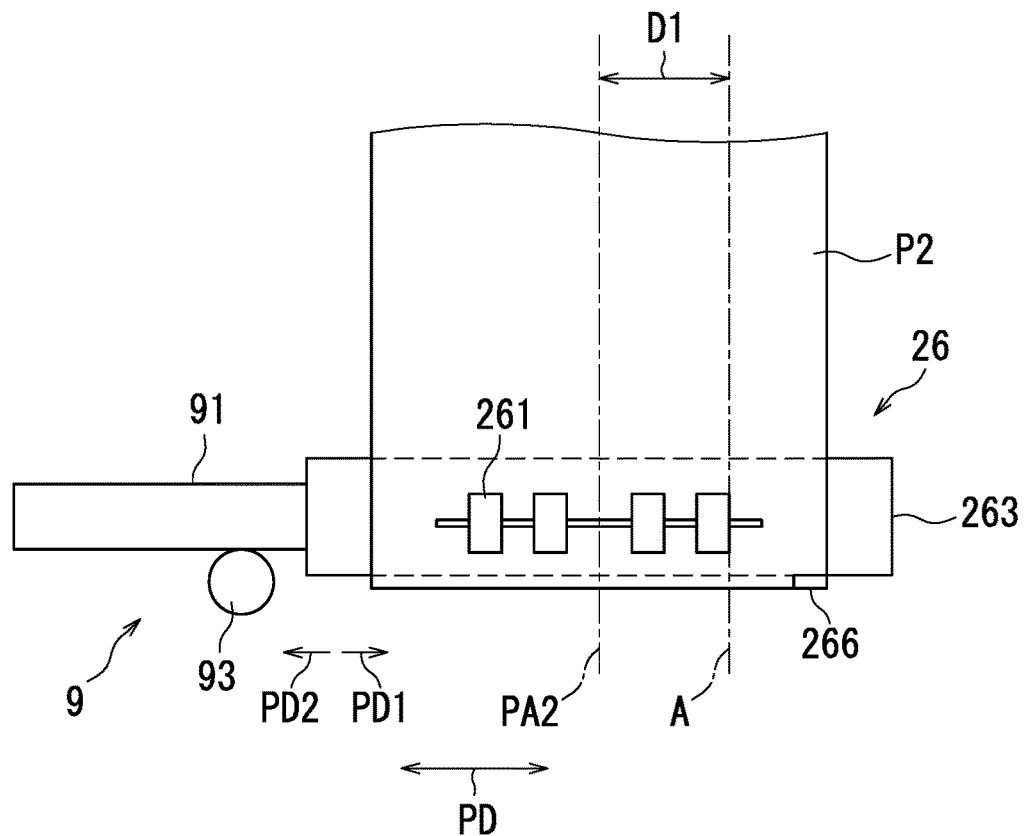
FIG. 5B is a plan view of the inverting section and the sheet displacing mechanism after the sheet displacing mechanism displaces the position of the invalid sheet.

The operation of the sheet displacing mechanism 9 will next be described with reference to FIGS. 5A and 5B. FIG. 5A is a front view of the inverting section 26 and the sheet displacing mechanism 9 after the sheet displacing mechanism 9 displaces the position of the invalid sheet P2. FIG. 5B is a plan view of the inverting section 26 and the sheet displacing mechanism 9 after the sheet displacing mechanism 9 displaces the position of the invalid sheet P2. Specifically, FIGS. 5A and 5B illustrate a state after the sheet displacing mechanism 9 displaces the position of the invalid sheet P2 in duplex printing such that the central axis PA2 of the invalid sheet P2 is separated from the central axis A of the second image. Note that in FIG. 5B the drive shaft 262, the inverting motor 264, the gears 265, and the drive source 92 are omitted for easy understanding.

As illustrated in FIGS. 5A and 5B, when the invalid sheet P2 is conveyed from the fourth conveyance section 2d (FIG. 1) to the inverting section 26, the sheet displacing mechanism 9 moves the inverting roller pairs 261 from the initial position such that the central axis PA2 of the invalid P2 leaves the central axis A of the second image. The position of the invalid sheet P2 is consequently displaced to a position where the central axis PA2 of the invalid sheet P2 is separated from the central axis A of the second image.

In the example depicted in FIGS. 5A and 5B, the sheet displacing mechanism 9 moves the inverting roller pairs 261 in the second direction PD2 from the initial position. The central axis PA2 of the invalid sheet P2 is consequently separated by a distance D1 in the second direction PD2 from the central axis A of the second image. Here, the distance D1 is a distance longer than the distance D described with reference to FIGS. 3A to 4B.

Figure 6:
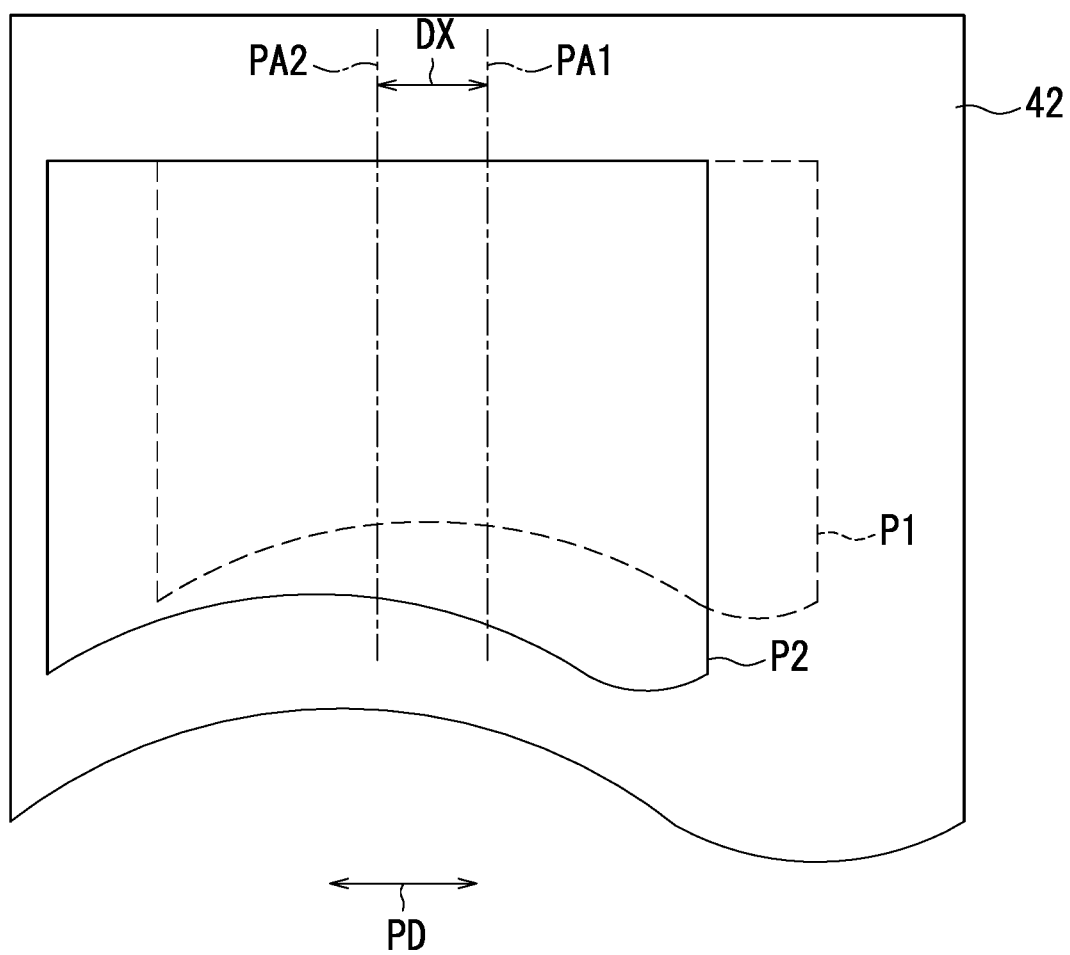
FIG. 6 illustrates the valid sheet and the invalid sheet ejected on the exit tray.

The valid sheet P1 and the invalid sheet P2 ejected on the exit tray 42 will next be described with reference to FIG. 6. FIG. 6 illustrates the valid sheet P1 and the invalid sheet P2 ejected on the exit tray 42.

As illustrated in FIG. 6, the position of the central axis PA2 of the invalid sheet P2 is displaced in the sheet width direction PD from the position of the central axis PA1 of the valid sheet P1. FIG. 6 illustrates a state where the central axis PA2 of the invalid sheet P2 is separated by a distance DX from the central axis PA1 of the valid sheet P1.

In the present embodiment, the valid sheet P1 and the invalid sheet P2 are ejected on the exit tray 42 in a state displaced in the sheet width direction PD as illustrated in FIG. 6. This enables the worker to easily distinguish the valid sheet P1 and the invalid sheet P2 on the exit tray 42. In the image forming apparatus 100 according to the present embodiment, it is therefore possible to assist the worker in work for sorting sheets P into valid sheets P1 (normal sheets) and invalid sheets P2 (error sheets) even if the ejection destination of the sheets P is restricted to one place.

Note that although the operation of the sheet displacing mechanism 9 in duplex printing has been described with reference to FIGS. 5A and 5B, the sheet displacing mechanism 9 may similarly displace the position of the invalid sheet P2 in simplex printing such that the central axis of the invalid sheet P2 is separated from the central axis PA1 of the valid sheet P1 in the sheet width direction PD.

Figure 7:
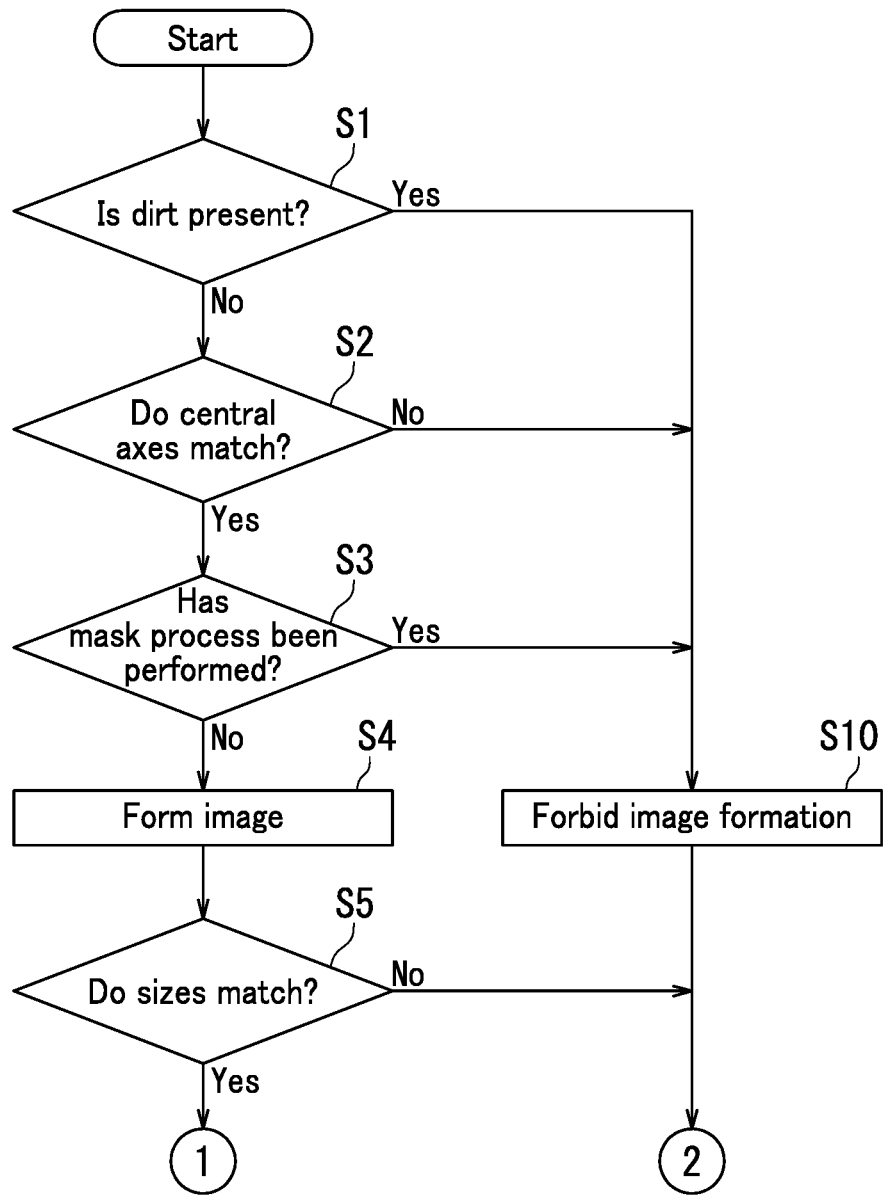
FIG. 7 is part of a flowchart depicting a process to be executed by a controller of the image forming apparatus.
Figure 8:
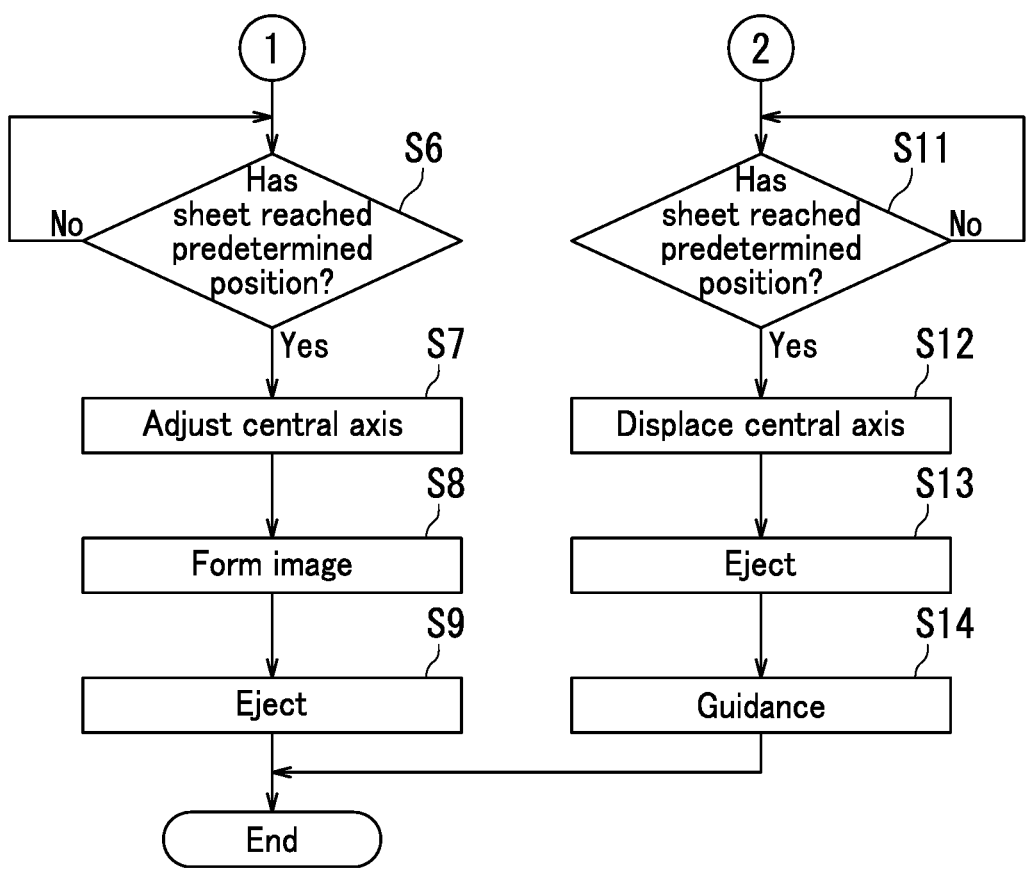
FIG. 8 is remaining part of the flowchart to be executed by the controller.

A process to be executed by the controller 8 (processing section 81) will next be described with reference to FIGS. 1, 7, and 8. FIGS. 7 and 8 are a flowchart depicting the process executed by the controller 8 (processing section 81). Specifically, FIGS. 7 and 8 illustrate a process executed by the controller 8 (processing section 81) in duplex printing.

The process illustrated in FIGS. 7 and 8 starts at a time when a sheet P is fed from the sheet feed section 10 to the conveyance section 2. As illustrated in FIG. 7, when the sheet P is fed from the sheet feed section 10 to the conveyance section 2, the controller 8 (processing section 81) determines whether or not dirt is present on the sheet P based on the dirt detection signal output from the dirt sensor 7a (Step S1). Specifically, in duplex printing, the controller 8 (processing section 81) determines whether or not dirt is present on any of the first and second sides of the sheet P.

If the controller 8 (processing section 81) determines that dirt is present on any of the first and second sides of the sheet P (Yes in Step S1), the process proceeds to Step S10. That is, if it is determined that the sheet P does not meet the first condition, the process proceeds to Step S10. Here, the sheet P with dirt being present on any of the first and second sides thereof is the valid sheet P2 (dirt-detected sheet P2).

If determining that no dirt is present on any of the first and second sides of the sheet P (No in Step S1), the controller 8 (processing section 81) determines whether or not the central axis PA of the sheet P matches the central axis A of the first image based on the image data included in the job data (Step S2).

If the controller 8 (processing section 81) determines that the central axis PA of the sheet P does not match the central axis A of the first image (No in Step S2), the process proceeds to Step S10. That is, if it is determined that the sheet P does not meet the second condition, the process proceeds to Step S10. Here, the sheet P whose central axis PA does not match the central axis A of the first image is the invalid sheet P2 (center position error sheet P2).

If determining that the central axis PA of the sheet P matches the central axis A of the first image (Yes in Step S2), the controller 8 (processing section 81) determines whether or not execution of the mask process has been detected (Step S3).

If the controller 8 (processing section 81) determines that the execution of the mask process has been detected (Yes in Step S3), the process proceeds to Step S10. That is, if it is determined that the sheet P does not meet the third condition, the process proceeds to Step S10. Here, the sheet P as to which the execution of the mask process has been detected is the invalid sheet P2 (mask process detection sheet P2).

If determining that no execution of the mask process has been detected (No in Step S3), the controller 8 (processing section 81) controls the image forming section 3 so that the first image is formed on the first side of the sheet P (Step S4). In the present embodiment, the controller 8 (processing section 81) controls the recording heads 31 when forming the image on the sheet P. Specifically, the controller 8 (processing section 81) determines nozzles to eject ink according to the image to be formed on the sheet P. The controller 8 then controls the recording heads 31 so that ink is ejected from the determined nozzles.

During image formation, the controller 8 (processing section 81) acquires an actual size of the sheet P based on the sheet image signal output from the image sensor 7b. The controller 8 (processing section 81) then determines whether or not the actual size matches a size indicated by the size data (Step S5). Here, the actual size is acquired after the image sensor 7b scans a whole of the sheet P. In other words, the actual size is acquired after a trailing edge of the sheet P passes through a position that is opposite the image sensor 7b.

In the present embodiment, the image sensor 7b is located between the registration roller pair 23 and the image forming section 3. When the trailing edge of the sheet P passes through the position facing the image sensor 7b, the leading edge of the sheet P has already passed or is passing through an area facing the image forming section 3. An action of Step S5 is therefore performed during image formation.

If the controller 8 (processing section 81) determines that the actual size does not match the size indicated by the size data (No in Step S5), the process proceeds to Step S11 illustrated in FIG. 8. That is, if it is determined that the sheet P does not meet the fourth condition, the process proceeds to Step S11. Here, the sheet P whose actual size does not match the size indicated by the size data is the invalid sheet S2 (size error sheet P2).

If determining that the actual size matches the size indicated by the size data (Yes in Step S5), the controller 8 (processing section 81) determines whether or not the sheet P has reached a predetermined position (Step S6 in FIG. 8). Note that the sheet P whose actual size is determined to match the size indicated by the size data is the valid sheet P1.

In the present embodiment, the controller 8 (processing section 81) determines whether or not the leading edge of the valid sheet P1 has reached the predetermined position outside the case member 263 after passing through the case member 263 of the inverting section 26. Specifically, the controller 8 (processing section 81) determines whether or not the sheet-leading-edge sensor 266 has detected the leading edge of the valid sheet P1. More specifically, the controller 8 (processing section 81) determines whether or not the leading edge of the valid sheet P1 has reached between the light-emitting element and the light-receiving element included in the photosensor.

If the controller 8 (processing section 81) determines that the valid sheet P1 has not reached the predetermined position (No in Step S6), the process returns to Step S6. In other words, action of Step S6 is repeated until the valid sheet P1 reaches the predetermined position.

If determining that the valid sheet P1 has reached the predetermined position (Yes in Step S6), the controller 8 (processing section 81) causes the conveyance section 2 to stop conveying the valid sheet P1, and subsequently controls the sheet displacing mechanism 9 to adjust a position of the central axis PA1 of the valid sheet P1 (Step S7). Specifically, the controller 8 (processing section 81) causes the sheet displacing mechanism 9 to displace the position of the valid sheet P1 so that the central axis PA1 of the valid sheet P1 matches the central axis A of the second image.

After the sheet displacing mechanism 9 adjusts the position of the central axis PA1 of the valid sheet P1, the controller 8 (processing section 81) controls the conveyance section 2 and the first conveyance unit 24 so that the valid sheet P1 passes through the area facing the image forming section 3. The controller 8 (processing section 81) also controls the image forming section 3 so that the second image is formed on the second side of the valid sheet P1 (Step S8). The controller 8 (processing section 81) subsequently controls the second conveyance unit 25, the conveyance section 2, and the first ejection section 4a so that the valid sheet P1 is ejected on the exit tray 42 (Step S9). The process illustrated in FIGS. 7 and 8 then ends.

In contrast, if determining that dirt is present on any of the first and second sides of the sheet P (Yes in Step S1 of FIG. 7), the controller 8 (processing section 81) forbids the image forming section 3 to form the first image (Step S10). In this case, the first image is not formed on the first side of the invalid sheet P2. It is consequently possible to prevent unnecessary printing on the invalid sheet P2 (error sheet). In addition, ink consumption can be reduced.

Similarly, if determining that the central axis PA of the sheet P does not match the central axis A of the first image (No in Step S2), the controller 8 (processing section 81) forbids the image forming section 3 to form the first image. If determining that execution of the mask process has been detected (Yes in Step S3), the controller 8 (processing section 81) forbids the image forming section 3 to form the first image (Step S10).

After forbidding the image forming section 3 to form the first image, the controller 8 (processing section 81) determines whether or not the invalid sheet P2 has reached the predetermined position (Step S11 in FIG. 8). Alternatively, if determining that the actual size does not match the size indicated by the size data (No in Step S5), the controller 8 (processing section 81) determines whether or not the invalid sheet P2 has reached the predetermined position (Step S11 in FIG. 8). In the present embodiment, the controller 8 (processing section 81) determines whether or not the leading edge of the invalid sheet P2 has reached the predetermined position outside the case member 263 after passing through the case member 263 of the inverting section 26.

If the controller 8 (processing section 81) determines that the invalid sheet P2 has not reached the predetermined position (No in Step S11), the process returns to Step S11. In other words, an action of Step S11 is repeated until the invalid sheet P2 reaches the predetermined position.

If determining that the invalid sheet P2 has reached the predetermined position (Yes in Step S11), the controller 8 (processing section 81) causes the conveyance section 2 to stop conveying the invalid sheet P2, and subsequently controls the sheet displacing mechanism 9 to cause it to displace the position of the central axis PA2 of the invalid sheet P2 (Step S12). Specifically, the controller 8 (processing section 81) controls the sheet displacing mechanism 9 so that the position of the invalid sheet P2 differs from the position of the valid sheet P1 on the exit tray 42. More specifically, the controller 8 (processing section 81) controls the sheet displacing mechanism 9 so that the central axis PA2 of the invalid sheet P2 is separated from the central axis A of the second image in the sheet width direction PD.

After the sheet displacing mechanism 9 displaces the position of the central axis PA2 of the invalid sheet P2, the controller 8 (processing section 81) controls the conveyance section 2, the first conveyance unit 24, and the second conveyance unit 25 so that the invalid sheet P2 is ejected on the exit tray 42 (Step S13).

After the invalid sheet P2 is ejected on the exit tray 42, the controller 8 (processing section 81) causes the touch display 51 of the operation panel 5 to display a guidance screen including a first guidance screen G1 and a second guidance screen G2 (Step S14). The guidance screen will be described later with reference to FIGS. 9A and 9B. The process illustrated in FIGS. 7 and 8 then ends.

Note that the execution order of Steps S1 to S3 and Step S5 may be changed as appropriate. In addition, although the controller 8 (processing section 81) determines whether or not the actual size matches the size indicated by the size data during image formation in the present embodiment, the controller 8 (processing section 81) may determine whether or not the actual size matches the size indicated by the size data before image formation. Specifically, the image sensor 7b is located in a position where the leading edge of the sheet P does not yet reach the area that is opposite the image forming section 3 when the trailing edge of the sheet P passes through the position facing the image sensor 7b. It is accordingly possible to determine whether or not the actual size matches the size indicated by the size data before image formation. In this case, formation of the first image on the first side of the invalid sheet P2 (size error sheet P2) can be forbidden.

The first guidance screen G1 and the second guidance screen G2 will next be described with reference to FIGS. 9A and 9B. The first guidance screen G1 and the second guidance screen G2 are displayed on the touch display 51 after the invalid sheet P is ejected on the exit tray 42. Specifically, the first guidance screen G1 and the second guidance screen G2 are displayed on the touch display 51 after a job ends.

Figure 9A:
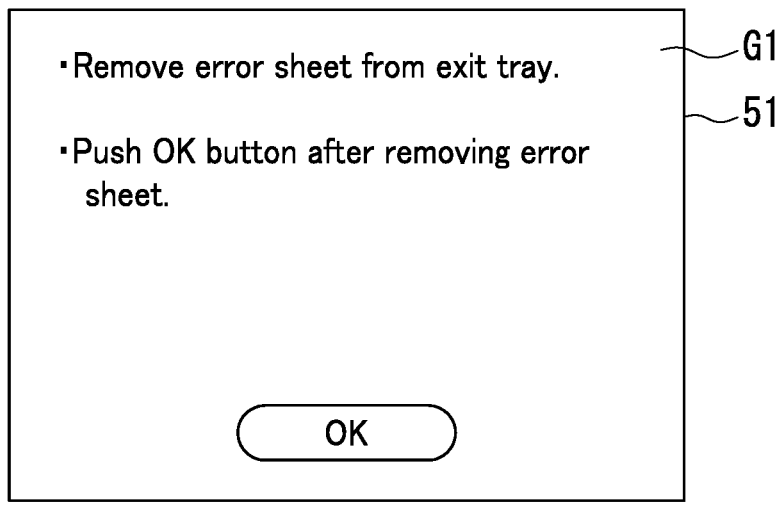
FIG. 9A illustrates a first guidance screen.

FIG. 9A illustrates the first guidance screen G1. As illustrated in FIG. 9A, the first guidance screen G1 includes a message prompting the worker to remove the invalid sheet P2 (error sheet) from the exit tray 42. The first guidance screen G1 being displayed on the touch display 51 enables the worker to more surely recognize that the invalid sheet P2 (error sheet) is present.

Figure 9B:
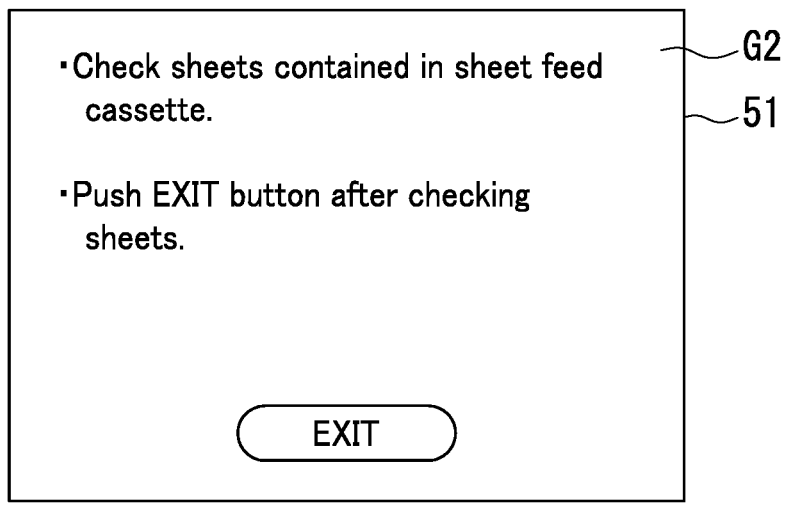
FIG. 9B illustrates a second guidance screen.

FIG. 9B illustrates the second guidance screen G2. The second guidance screen G2 is displayed on the touch display 51 after the first guidance screen G1 is displayed. Specifically, the second guidance screen G2 is displayed on the touch display 51 after an OK button on the first guidance screen G1 is operated.

As illustrated in FIG. 9B, the second guidance screen G2 includes a message prompting the worker to confirm sheets P contained in the cassette 11 (sheet feed cassette). The worker consequently replaces some of the sheets P contained in the cassette 11 or adjusts the position of a cursor provided in the cassette 11. It is therefore possible to prevent presence of invalid sheets P2 (error sheets).

That is, one or more dirty sheets P being contained in the cassette 11 often cause presence of dirt-detected sheets P2. The worker therefore replaces some of the sheets P contained in the cassette 11 and can thereby prevent presence of the dirt-detected sheets P2.

An inappropriately-positioned cursor in the cassette 11 often causes presence of center position error sheets P2. Specifically, sheets P contained in the cassette 11 can be aligned using the cursor. However, the inappropriately-positioned cursor displaces the position of the sheets P thereby causing presence of the center position error sheets P2. The worker therefore adjusts the position of the cursor and can thereby prevent presence of center position error sheets P2.

Punch-hole-formed sheets P being contained in the cassette 11 cause presence of mask process detection sheets P2. The worker therefore replaces some of the sheets P contained in the cassette 11 and can thereby prevent presence of the mask process detection sheets P2.

Sheets P each having a size different from predetermined size (size indicated by size data) being contained in the cassette 11 cause presence of size error sheets P2. The worker therefore replaces some of the sheets P contained in the cassette 11 and can thereby prevent presence of the size error sheets P2.

Second Embodiment

A second embodiment of the present disclosure will next be described with reference to FIGS. 1, 8, 10, and 11. However, items different from those in the first embodiment will be described, and description of the same items as those in the first embodiment will be omitted. The second embodiment differs from the first embodiment in a process by a controller 8 (processing section 81). Specifically, the second embodiment differs from the first embodiment in an operation of a sheet displacing mechanism 9.

Figure 10:
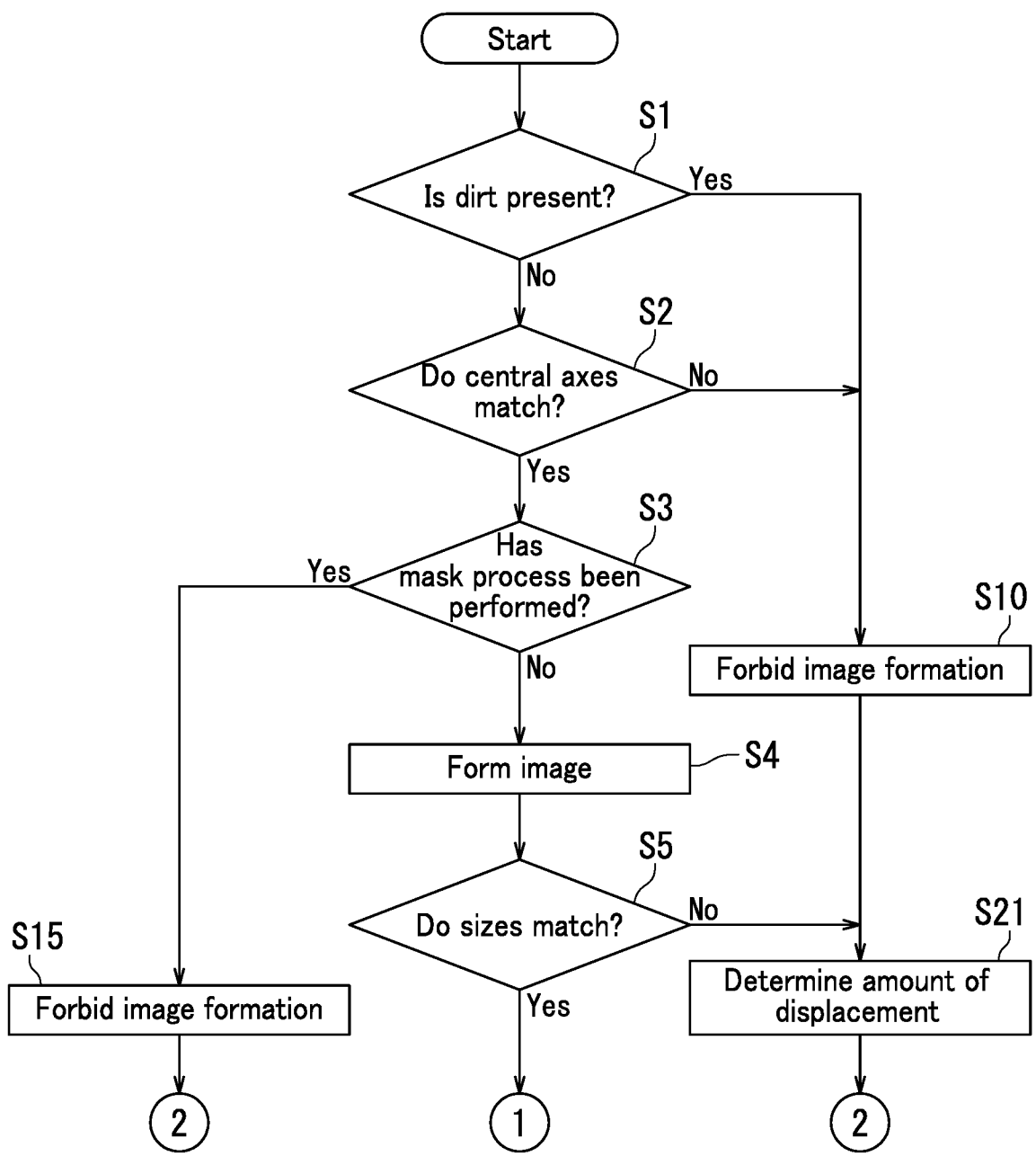
FIG. 10 is part of a flowchart depicting a process to be executed by a controller in a second embodiment of the present disclosure.

FIG. 10 is part of a flowchart depicting a process executed by the controller 8 (processing section 81) in the present embodiment. In the present embodiment, Steps S15 and S21 as illustrated in FIG. 10 are added to the flowchart described with reference to FIGS. 7 and 8.

In the present embodiment, if a sheet P is an invalid sheet P2, the controller 8 (processing section 81) determines an amount of displacement of a central axis PA2 of the invalid sheet P2 (Step S21). Specifically, the controller 8 (processing section 81) further determines a dissociation degree indicating how much the invalid sheet P2 deviates from a predetermined condition. The controller 8 (processing section 81) then determines a degree of separation of the invalid sheet P2 from the valid sheet P1 on an exit tray 42 according to the dissociation degree.

Specifically, if determining that dirt is present on any of first and second sides of the sheet P (Yes in Step S1), the controller 8 (processing section 81) determines a degree of dirt as the dissociation degree from a dirt detection signal output from a dirt sensor 7a. In the present embodiment, the controller 8 (processing section 81) determines the degree of dirt in three levels. Specifically, storage 82 stores therein two thresholds for the degree of dirt. The controller 8 (processing section 81) determines the degree of dirt using the two thresholds. The controller 8 (processing section 81) then determines, in three levels, an amount of displacement of the central axis PA2 of the invalid sheet P2 (dirt-detected sheet P2) according to the degree of dirt (Step S21).

Similarly, if determining that a central axis of the sheet P does not match a central axis A of a first image (No in Step S2), the controller 8 (processing section 81) determines a separation amount indicating a distance between the central axis PA of the sheet P and the central axis A of the first image as the dissociation degree. In the present embodiment, the controller 8 (processing section 81) determines the separation amount in three levels. Specifically, the storage 82 stores therein three thresholds with respect to the separation amount. The controller 8 (processing section 81) determines the separation amount in three levels using the three thresholds. The controller 8 (processing section 81) then determines, in three levels, an amount of displacement of the central axis PA2 of the invalid sheet P2 (center position error sheet P2) according to the separation amount (Step S21).

In addition, if determining that an actual size does not match a size indicated by size data (No in Step S5), the controller 8 (processing section 81) determines a size difference indicating a difference between the actual size and the size indicated by size data as the dissociation degree. In the present embodiment, the controller 8 (processing section 81) determines the size difference in three levels. Specifically, the storage 82 stores therein three thresholds with respect to the size difference. The controller 8 (processing section 81) determines the size difference in three levels using the three thresholds. The controller 8 (processing section 81) then determines, in three levels, an amount of displacement of the central axis PA2 of the invalid sheet P2 (size error sheet P2) according to the size difference (Step S21).

Note that if having detected execution of a mask process (Yes in Step S3), the controller 8 (processing section 81) forbids an image forming section 3 to form the first image (Step S15) and subsequently determines whether or not the invalid sheet P2 has reached a predetermined position (Step S11 in FIG. 8).

Figure 11:
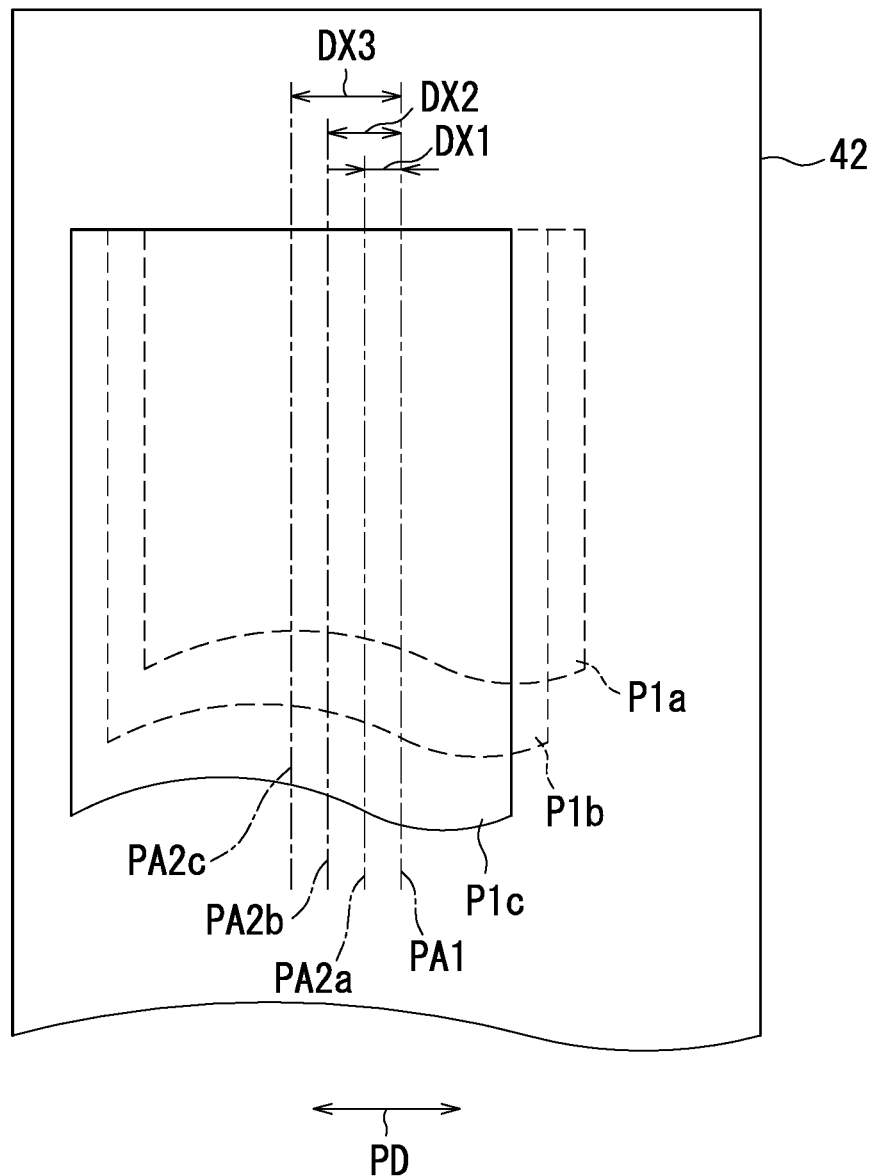
FIG. 11 illustrates invalid sheets ejected on an exit tray in the second embodiment of the present disclosure.

The amount of displacement of the central axis PA2 of the invalid sheet P2 will next be described with reference to FIG. 11. FIG. 11 illustrates the invalid sheet P2 ejected on the exit tray 42 in the present embodiment. Note that FIG. 11 illustrates a central axis PA1 of a valid sheet P1 for easy understanding.

As illustrated in FIG. 11, the invalid sheet P2 includes a first invalid sheet P2a, a second invalid sheet P2b, and a third invalid sheet P2c in the present embodiment. The first invalid sheet P2a is an invalid sheet P2 with a smallest dissociation degree, of three-level dissociation degrees. The third invalid sheet P2c is an invalid sheet P2 with a largest dissociation degree of the three-level dissociation degrees. The second invalid sheet P2b is an invalid sheet P2 with a dissociation degree between the smallest dissociation degree and the largest dissociation degree, of the three-level dissociation degrees.

A central axis PA2a of the first invalid sheet P2a is separated by a distance DX1 from the central axis PA1 of the valid sheet P1 on the exit tray 42. A central axis PA2b of the second invalid sheet P2b is separated by a distance DX2 from the central axis PA1 of the valid sheet P1. A central axis PA2c of the third invalid sheet P2c is separated by a distance DX3 from the central axis PA1 of the valid sheet P1. The distance DX1 is a distance shorter than the distance DX2 and the distance DX3. The distance DX2 is a distance longer than the distance DX1 and shorter than the distance DX3. The distance DX3 is a distance longer than the distance DX1 and the distance DX2.

The second embodiment of the present disclosure has been described above with reference to FIGS. 10 and 11. In the present embodiment, invalid sheets P2 can be sorted according to the dissociation degree from the predetermined condition, and convenience for a user is improved.

Note that although the controller 8 (processing section 81) determines the dissociation degree in three levels in the present embodiment, the dissociation degree may be determined in two levels or four or more levels. Alternatively, the controller 8 (processing section 81) may determine the dissociation degree steplessly.

Third Embodiment

A third embodiment of the present disclosure will next be described with reference to FIG. 12. However, items different from those in the first and second embodiments will be described, and description of the same items as those in the first and second embodiments will be omitted. The third embodiment differs from the first and second embodiments in that an image forming apparatus 100 includes a second sheet displacing mechanism 9b.

Figure 12:
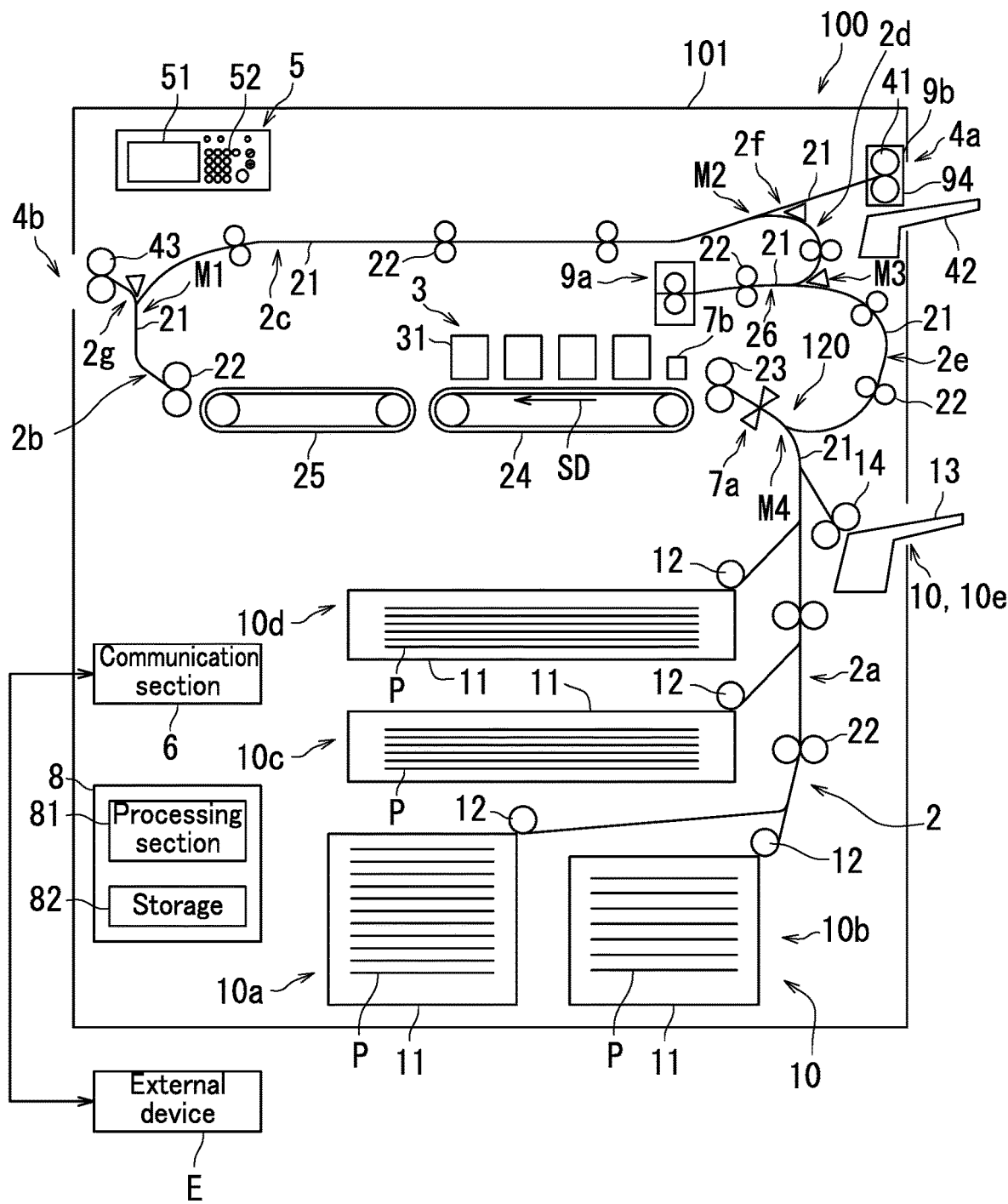
FIG. 12 is a structural diagram of an image forming apparatus according to a third embodiment of the present disclosure.

FIG. 12 is a structural diagram of the image forming apparatus 100 according to the present embodiment. As illustrated in FIG. 12, the image forming apparatus 100 according to the present embodiment includes a first sheet displacing mechanism 9a and the second sheet displacing mechanism 9b.

The first sheet displacing mechanism 9a is located at an inverting section 26 like the sheet displacing mechanism 9 described in the first embodiment. The first sheet displacing mechanism 9a is used to align a central axis PA1 of a valid sheet P1 with a central axis A of a second image in duplex printing.

The second sheet displacing mechanism 9b is located at a first ejection section 4a. The second sheet displacing mechanism 9b displaces a position of a central axis PA2 of an invalid sheet P2 in a sheet width direction PD like the sheet displacing mechanism 9 described in the first embodiment.

Specifically, the second sheet displacing mechanism 9b includes a case member 94 (FIG. 12) in addition to a coupling member 91, a drive source 92, and a driving force transmission section 93 like those described with reference to FIG. 3A. The case member 94 contains a first ejection roller pair 41. The case member 94 supports the first ejection roller pair 41 in a rotatable manner. The coupling member 91 of the second sheet displacing mechanism 9b is coupled to the case member 94. The drive source 92 of the second sheet displacing mechanism 9b generates a driving force for moving the case member 94 in the sheet width direction PD. In other words, the drive source 92 of the second sheet displacing mechanism 9b generates a driving force for moving the first ejection roller pair 41 in the sheet width direction PD.

The third embodiment of the present disclosure has been described above with reference to FIG. 12. In the present embodiment, the invalid sheet P2 can be ejected at a position different from a position of the valid sheet P1 on an exit tray 42. In the image forming apparatus 100 according to the present embodiment, it is accordingly possible to assist a worker in work for sorting sheets P into valid sheets P1 (normal sheets) and invalid sheets P2 (error sheets) even if the ejection destination of the sheets P is restricted to one place.

Note that although the first ejection roller pair 41 is provided with the second sheet displacing mechanism 9b in the present embodiment, any one of conveyance roller pairs 22 of a conveyance section 2 (except inverting roller pairs 261 of the inverting section 26) may be provided with the second sheet displacing mechanism 9b.

Fourth Embodiment

A fourth embodiment of the present disclosure will next be described with reference to FIGS. 13A and 13B. However, items different from those in the first to third embodiments will be described, and description of the same items as those in the first to third embodiments will be omitted. The fourth embodiment differs from the first to third embodiments in that an exit tray 42 is provided with a second sheet displacing mechanism 9b.

Figure 13A:
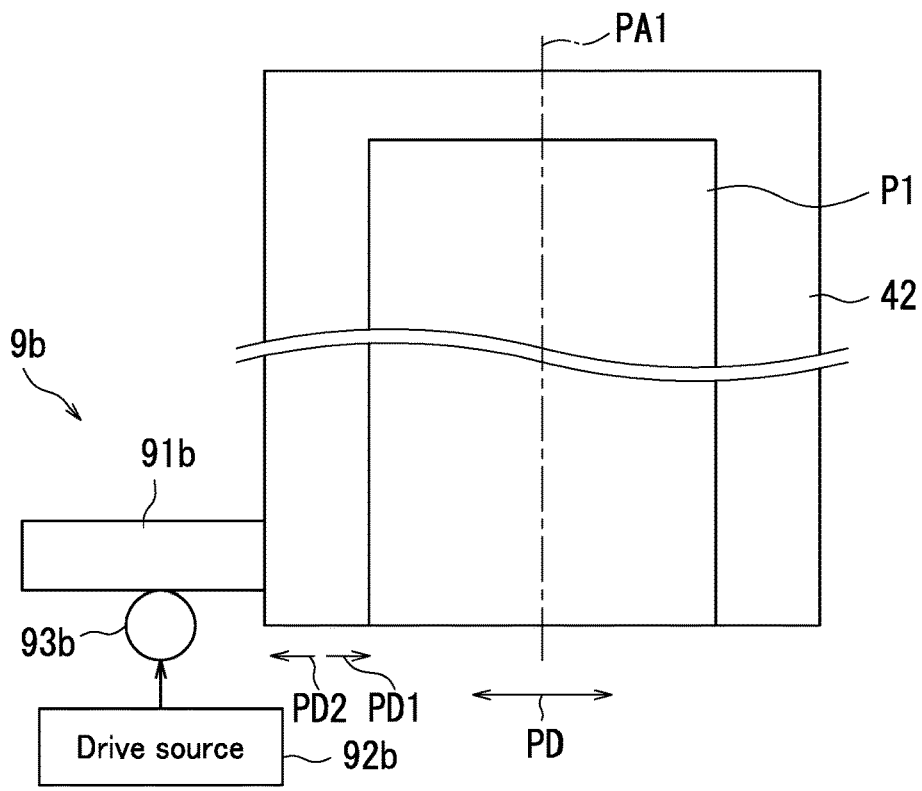
FIG. 13A illustrates a second sheet displacing mechanism in a fourth embodiment of the present disclosure.

FIG. 13A illustrates the second sheet displacing mechanism 9b in the present embodiment. Note that FIG. 13A illustrates a valid sheet P1 ejected on the exit tray 42 for easy understanding.

As illustrated in FIG. 13A, the second sheet displacing mechanism 9b includes a coupling member 91b, a drive source 92b, and a driving force transmission section 93b like the sheet displacing mechanism 9 described with reference to FIG. 3A.

The coupling member 91b is coupled to the exit tray 42. The drive source 92b generates a driving force for moving the coupling member 91b in a sheet width direction PD. The driving force transmission section 93b transmits the driving force generated by the drive source 92b to the coupling member 91b. The coupling member 91b consequently moves and the exit tray 42 moves in the sheet width direction PD. The second sheet displacing mechanism 9b moves the exit tray 42 in the sheet width direction PD when an invalid sheet P2 is ejected on the exit tray 42.

Operation of the second sheet displacing mechanism 9b in the present embodiment will next be described with reference to FIGS. 13A and 13B. FIG. 13B is a plan view of the exit tray 42 moved in the sheet width direction PD by the second sheet displacing mechanism 9b. Note that FIG. 13B illustrates the valid sheet P1 and the invalid sheet P2 ejected on the exit tray 42 for easy understanding.

Figure 13B:
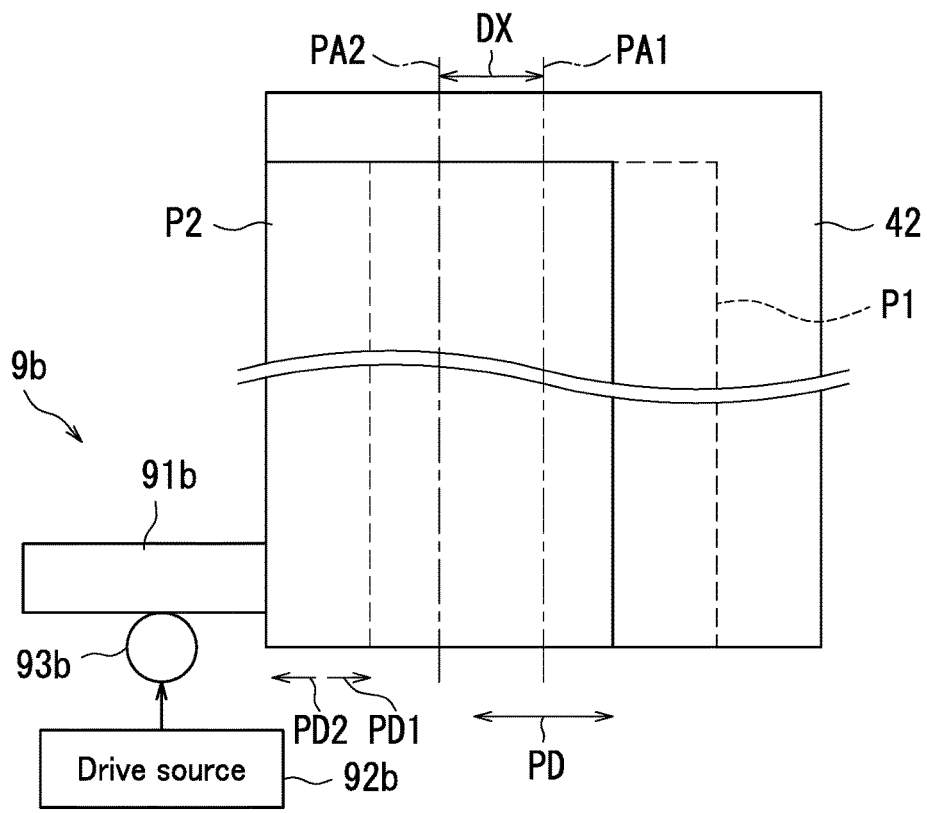
FIG. 13B is a plan view of an exit tray moved in a sheet width direction by the second sheet displacing mechanism.

As illustrated in FIGS. 13A and 13B, in ejection of the invalid sheet P2 on the exit tray 42, the second sheet displacing mechanism 9b moves the exit tray 42 in the sheet width direction PD so that a central axis PA2 of the invalid sheet P2 leaves a central axis PA1 of the valid sheet P1. A position of the invalid sheet P2 is consequently displaced to a position away from the central axis PA1 of the valid sheet P1. FIG. 13B illustrates a state where the central axis PA2 of the invalid sheet P2 is separated by a distance DX from the central axis PA1 of the valid sheet P1.

The fourth embodiment of the present disclosure has been described above with reference to FIGS. 13A and 13B. In the present embodiment, the invalid sheet P2 can be ejected at a position different from a position of the valid sheet P1 on the exit tray 42. In an image forming apparatus 100 according to the present embodiment, it is accordingly possible to assist a worker in work for sorting sheets P into valid sheets P1 (normal sheets) and invalid sheets P2 (error sheets) even if the ejection destination of the sheets P is restricted to one place.

The embodiments of the present disclosure are described above with reference to the accompanying drawings. However, the present disclosure is not limited to the above embodiments and may be implemented in various manners within a scope not departing from the gist thereof. Furthermore, the constituent elements disclosed in the above-described embodiments may be altered as appropriate. For example, a constituent element of all the constituent elements illustrated in an embodiment may be added to constituent elements of another embodiment, or some of all the constituent elements illustrated in an embodiment may be deleted from the embodiment.

The drawings illustrate main elements of configuration schematically to facilitate understanding of the present disclosure. Aspects of the elements of configuration such as thickness, length, number, intervals, and the like illustrated in the drawings may differ in practice for the sake of convenience for drawing preparation. Furthermore, the elements of configuration described in the above embodiments are merely examples and not particular limitations. The elements of configuration may be variously altered within a scope not substantially departing from the effects of the present disclosure.

For example, although the image forming apparatus 100 is a printer in the embodiments of the present disclosure, the present disclosure may be applied to an image forming apparatus other than the printer, such as a copier, a multi-function peripheral, and a facsimile machine.

Although the image forming apparatus 100 forms an image by an inkjet method in the embodiments of the present disclosure, the present disclosure may be applied to an image forming apparatus that forms an image by a method other than the inkjet method, such as an electrophotographic method.

Although the image forming apparatus 100 is capable of duplex printing in the embodiments of the present disclosure, the present disclosure may be applied to an image forming apparatus that is capable of only simplex printing.

Although the image forming apparatus 100 is capable of color printing in the embodiments of the present disclosure, the present disclosure may be applied to an image forming apparatus that is capable of only monochrome printing.

Although the first conveyance section 2a is provided with the dirt sensor 7a in the embodiments of the present disclosure, the position in which the dirt sensor 7a is located is not particularly limited as long as the dirt sensor 7a is located in a position where dirt on the sheet P can be detected.

Although the dirt sensor 7a detects dirt on both sides of the sheet P in the embodiments of the present disclosure, the dirt sensor 7a may detect dirt on one side of the sheet P.

Although the image sensor 7b is located between the registration roller pair 23 and the image forming section 3 in the embodiments of the present disclosure, the position in which the image sensor 7b is located is not particularly limited as long as the image sensor 7b can generate a sheet image signal representing an image of the sheet P.

Although it is determined that a sheet P is an invalid sheet P2 when the sheet P does not meet any of the first to fourth conditions in the embodiments of the present disclosure, it may be determined that a sheet P is an invalid sheet P2 when the sheet P does not meet two or more conditions or three or more conditions of the first to fourth conditions. Alternatively, it may be determined that a sheet P is an invalid sheet P2 when the sheet P does not meet all the first to fourth conditions.

Although a dissociation degree for each of the first, second, and fourth conditions is determined in the second embodiment of the present disclosure, a dissociation degree may be determined with respect to a combination of two or more conditions of the first, second, and fourth conditions.

Although it is determined whether or not a sheet P meet the first to fourth conditions in the embodiments of the present disclosure, at least one of the first to fourth conditions may be omitted. In other words, the predetermined condition may include at least one of the first to fourth conditions.

Although an actual size of a sheet P is determined using the image sensor 7b in the embodiments of the present disclosure, a member for determining the actual size of the sheet P is not limited to the image sensor 7b. For example, an actuator that turns on when the sheet P passes therethrough may be employed. In this case, it is possible to determine a size of the sheet P in the conveyance direction SD based on time during which the actuator is turned on.

What is claimed is:

1. An image forming apparatus comprising:
an exit tray that allows a sheet to be ejected thereon;
a displacing mechanism configured to displace a position of the sheet on the exit tray;
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray;
a conveyance section configured to convey the sheet; and
an image forming section configured to form an image on the sheet, wherein
the conveyance section includes an inverting section configured to invert the sheet with the image formed on a side thereof,
the inverting section is provided with the displacing mechanism,
based on determination of the sheet being the valid sheet, the controller controls the displacing mechanism so that a central axis of the sheet matches a central axis of the image, and
based on determination of the sheet being the invalid sheet, the controller controls the displacing mechanism so that the central axis of the sheet is separated from the central axis of the image.

2. An image forming apparatus comprising:
an ejection tray that allows a sheet to be ejected thereon;
a displacing mechanism configured to displace a position of the sheet on the exit tray;
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray; and a sensor configured to detect dirt on the sheet, wherein
the predetermined condition includes a condition that no dirt is present on the sheet, and
the controller determines whether or not no dirt is present on the sheet to determine whether the sheet is the valid sheet or the invalid sheet.

3. An image forming apparatus comprising:
an ejection tray that allows a sheet to be ejected thereon;
a displacing mechanism configured to displace a position of the sheet on the exit tray;
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray; and
an image forming section configured to form an image on the sheet, wherein
the predetermined condition includes a condition that a central axis of the sheet match a central axis of the image, and
the controller determines whether or not the central axis of the sheet matches the central axis of the image to determine whether the sheet is the valid sheet or the invalid sheet.

4. An image forming apparatus comprising:
an ejection tray that allows a sheet to be ejected thereon;
a displacing mechanism configured to displace a position of the sheet on the exit tray;
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray;
a conveyance section configured to convey the sheet; and
storage that stores therein size data indicating a size of the sheet, wherein
the predetermined condition includes a condition that an actual size matches the size indicated by the size data, the actual size being a size of the sheet being conveyed by the conveyance section, and
the controller determines whether or not the actual size matches the size indicated by the size data to determine whether the sheet is the valid sheet or the invalid sheet.

5. An image forming apparatus comprising:
an ejection tray that allows a sheet to be ejected thereon;
a displacing mechanism configured to displace a position of the sheet on the exit tray; and
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray, wherein
the predetermined condition includes a condition that no hole be formed in the sheet, and
the controller determines whether or not no hole is formed in the sheet to determine whether the sheet is the valid sheet or the invalid sheet.

6. An image forming apparatus comprising:
an ejection tray that allows a sheet to be ejected thereon;
a displacing mechanism configured to displace a position of the sheet on the exit tray;
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray; and
an image forming section configured to form an image on the sheet, wherein
based on determination of the sheet being the invalid sheet, the controller forbids the image forming section to form the image.

7. An image forming apparatus comprising:
an ejection tray that allows a sheet to be ejected thereon;
a displacing mechanism configured to displace a position of the sheet on the exit tray; and
a controller configured to control the displacing mechanism, the controller determining whether the sheet is a valid sheet that meets a predetermined condition or an invalid sheet that does not meet the predetermined condition, and controlling the displacing mechanism so that a position of the valid sheet differs from a position of the invalid sheet on the exit tray, wherein
the controller further determines a dissociation degree indicating how much the invalid sheet deviates from the predetermined condition, and
the controller determines a degree of separation of the position of the invalid sheet from the position of the valid sheet on the exit tray according to the dissociation degree.

* * * * *